(12) United States Patent
Wang et al.

(10) Patent No.: US 7,941,149 B2
(45) Date of Patent: May 10, 2011

(54) MULTI-HOP ULTRA WIDE BAND WIRELESS NETWORK COMMUNICATION

(75) Inventors: Xudong Wang, Kirkland, WA (US); Chao Gui, San Diego, CA (US); Weilin Wang, San Diego, CA (US); Michael Nova, Del Mar Mesa, CA (US)

(73) Assignee: Misonimo Chi Acquistion L.L.C., Dover, DE (US)

( * ) Notice: Subject to any disclaimer, the term of this patent is extended or adjusted under 35 U.S.C. 154(b) by 907 days.

(21) Appl. No.: 11/615,582

(22) Filed: Dec. 22, 2006

(65) Prior Publication Data
US 2007/0104215 A1    May 10, 2007

Related U.S. Application Data

(63) Continuation-in-part of application No. 10/816,481, filed on Apr. 1, 2004, now abandoned, which is a continuation-in-part of application No. 10/437,128, filed on May 13, 2003, and a continuation-in-part of application No. 10/437,129, filed on May 13, 2003, application No. 11/615,582, which is a continuation-in-part of application No. 11/076,738, filed on Mar. 9, 2005, now abandoned, and a continuation-in-part of application No. 11/420,668, filed on May 26, 2006, which is a continuation-in-part of application No. 11/076,738, which is a continuation-in-part of application No. 10/816,481, application No. 11/615,582, which is a continuation-in-part of application No. 11/462,663, filed on Aug. 4, 2006, which is a continuation-in-part of application No. 10/816,481, and a continuation-in-part of application No. 11/076,738, and a continuation-in-part of application No. 11/420,668.

(60) Provisional application No. 60/380,425, filed on May 13, 2002, provisional application No. 60/747,409, filed on May 16, 2006.

(51) Int. Cl.
*H04W 40/00* (2009.01)
*H04L 12/28* (2006.01)

(52) U.S. Cl. .............. 455/445; 455/452.2; 370/235; 370/400; 370/406

(58) Field of Classification Search .......... 455/41.2, 455/445, 452.2; 370/235, 237, 238, 338, 370/400, 406, 465, 468, 477, 498
See application file for complete search history.

(56) References Cited

U.S. PATENT DOCUMENTS

| | | | |
|---|---|---|---|
| 4,706,689 A | 11/1987 | Man | |
| 5,309,437 A | 5/1994 | Perlman et al. | |
| 5,699,355 A * | 12/1997 | Natarajan | 370/322 |
| 5,844,905 A | 12/1998 | McKay et al. | |
| 5,940,771 A | 8/1999 | Gollnick et al. | |
| 5,943,322 A | 8/1999 | Mayor et al. | |
| 5,959,999 A | 9/1999 | An | |
| 6,003,007 A | 12/1999 | DiRienzo | |
| 6,023,563 A | 2/2000 | Shani | |
| 6,076,066 A | 6/2000 | DiRienzo | |
| 6,122,516 A * | 9/2000 | Thompson et al. | 455/450 |
| 6,161,104 A | 12/2000 | Stakutis et al. | |
| 6,173,387 B1 | 1/2001 | Baxter et al. | |
| 6,199,115 B1 | 3/2001 | DiRienzo | |
| 6,208,629 B1 | 3/2001 | Jaszewski et al. | |
| 6,226,642 B1 | 5/2001 | Beranek et al. | |
| 6,226,684 B1 | 5/2001 | Sung et al. | |
| 6,236,662 B1 * | 5/2001 | Reilly | 370/462 |
| 6,272,492 B1 | 8/2001 | Kay | |
| 6,282,513 B1 | 8/2001 | Strawder | |
| 6,289,316 B1 | 9/2001 | Aghili et al. | |
| 6,292,596 B1 | 9/2001 | Snyder et al. | |
| 6,330,244 B1 | 12/2001 | Swartz et al. | |
| 6,331,762 B1 | 12/2001 | Bertness | |
| 6,336,114 B1 | 1/2002 | Garrison | |
| 6,338,093 B1 | 1/2002 | DiRienzo | |
| 6,343,310 B1 | 1/2002 | DiRienzo | |
| 6,345,260 B1 | 2/2002 | Cummings, Jr. et al. | |
| 6,349,334 B1 | 2/2002 | Faupel et al. | |
| 6,356,992 B1 | 3/2002 | Baxter et al. | |
| 6,357,010 B1 | 3/2002 | Viets et al. | |
| 6,366,683 B1 | 4/2002 | Langlotz | |
| 6,366,912 B1 | 4/2002 | Wallent et al. | |
| 6,366,929 B1 | 4/2002 | Dartigues et al. | |
| 6,385,730 B2 | 5/2002 | Garrison | |
| 6,414,955 B1 | 7/2002 | Clare et al. | |
| 6,418,549 B1 | 7/2002 | Ramchandran et al. | |

| | | |
|---|---|---|
| 6,434,191 B1 | 8/2002 | Agrawal et al. |
| 6,460,128 B1 | 10/2002 | Baxter et al. |
| 6,480,497 B1 | 11/2002 | Flammer, III et al. |
| 6,526,534 B1 | 2/2003 | Nagoya |
| 6,625,605 B1 | 9/2003 | Terakura et al. |
| 6,628,636 B1 | 9/2003 | Young |
| 6,640,087 B2 | 10/2003 | Reed et al. |
| 6,665,311 B2 * | 12/2003 | Kondylis et al. ............... 370/462 |
| 6,671,840 B1 | 12/2003 | Nagoya et al. |
| 6,687,259 B2 | 2/2004 | Alapuranen |
| 6,694,313 B1 | 2/2004 | Roemer |
| 6,704,321 B1 | 3/2004 | Kamiya |
| 6,754,188 B1 | 6/2004 | Garahi et al. |
| 6,754,499 B1 | 6/2004 | Smith |
| 6,760,877 B1 * | 7/2004 | Lappetelainen et al. ....... 714/748 |
| 6,763,007 B1 | 7/2004 | La Porta et al. |
| 6,763,013 B2 | 7/2004 | Kennedy |
| 6,788,702 B1 | 9/2004 | Garcia-Luna-Aceves et al. |
| 6,791,949 B1 | 9/2004 | Ryu et al. |
| 6,795,418 B2 * | 9/2004 | Choi ............................ 370/336 |
| 6,807,165 B2 | 10/2004 | Belcea |
| 6,839,541 B2 | 1/2005 | Alzoubi et al. |
| 6,845,084 B2 | 1/2005 | Rangnekar et al. |
| 6,850,502 B1 | 2/2005 | Kagan et al. |
| 6,850,511 B2 | 2/2005 | Kats et al. |
| 6,853,641 B2 | 2/2005 | Lindhorst-Ko et al. |
| 6,865,371 B2 | 3/2005 | Salonidis et al. |
| 6,868,072 B1 * | 3/2005 | Lin et al. ..................... 370/276 |
| 6,870,846 B2 | 3/2005 | Cain |
| 6,879,570 B1 | 4/2005 | Choi |
| 6,894,985 B2 | 5/2005 | Billhartz |
| 6,904,021 B2 | 6/2005 | Belcea |
| 6,907,257 B1 | 6/2005 | Mizutani et al. |
| 6,909,721 B2 | 6/2005 | Ekberg et al. |
| 6,912,215 B1 | 6/2005 | Lin et al. |
| 6,948,048 B2 | 9/2005 | Baxter et al. |
| 6,950,418 B1 | 9/2005 | Young et al. |
| 6,961,310 B2 | 11/2005 | Cain |
| 6,965,575 B2 | 11/2005 | Srikrishna et al. |
| 6,970,714 B2 | 11/2005 | D'Souza et al. |
| 6,975,613 B1 * | 12/2005 | Johansson .................... 370/338 |
| 6,975,614 B2 | 12/2005 | Kennedy |
| 6,980,524 B1 | 12/2005 | Lu et al. |
| 6,985,476 B1 | 1/2006 | Elliott et al. |
| 6,986,161 B2 | 1/2006 | Billhartz |
| 6,990,092 B1 | 1/2006 | Siala |
| 6,993,358 B2 | 1/2006 | Shiotsu et al. |
| 7,002,944 B2 | 2/2006 | Kats et al. |
| 7,003,313 B2 | 2/2006 | Garces et al. |
| 7,007,102 B2 | 2/2006 | Billhartz et al. |
| 7,016,328 B2 | 3/2006 | Chari et al. |
| 7,027,426 B2 | 4/2006 | Billhartz |
| 7,031,293 B1 | 4/2006 | Srikrishna et al. |
| 7,035,207 B2 | 4/2006 | Winter et al. |
| 7,046,639 B2 | 5/2006 | Garcia-Luna-Aceves et al. |
| 7,046,649 B2 | 5/2006 | Awater et al. |
| 7,047,473 B2 | 5/2006 | Hwang et al. |
| 7,050,806 B2 | 5/2006 | Garces et al. |
| 7,050,819 B2 | 5/2006 | Schwengler et al. |
| 7,053,770 B2 | 5/2006 | Ratiu et al. |
| 7,054,126 B2 | 5/2006 | Strutt et al. |
| 7,058,021 B2 | 6/2006 | Srikrishna et al. |
| 7,061,895 B1 | 6/2006 | Habetha |
| 7,062,286 B2 | 6/2006 | Grivas et al. |
| 7,069,483 B2 | 6/2006 | Gillies |
| 7,075,414 B2 | 7/2006 | Giannini et al. |
| 7,082,111 B2 | 7/2006 | Amouris |
| 7,082,115 B2 | 7/2006 | Bauer et al. |
| 7,089,066 B2 | 8/2006 | Hesse et al. |
| 7,091,852 B2 * | 8/2006 | Mason et al. ............ 340/539.13 |
| 7,095,732 B1 * | 8/2006 | Watson, Jr. ................... 370/346 |
| 7,116,983 B2 * | 10/2006 | Lan et al. ..................... 455/452.2 |
| 7,139,336 B2 | 11/2006 | Nefedov |
| 7,151,777 B2 | 12/2006 | Sawey |
| 7,233,584 B2 | 6/2007 | Nguyen et al. |
| 7,245,947 B2 | 7/2007 | Salokannel et al. |
| 7,251,224 B2 | 7/2007 | Ades et al. |
| 7,269,198 B1 * | 9/2007 | Elliott et al. ................... 375/130 |
| 7,280,555 B2 | 10/2007 | Stanforth et al. |
| 7,301,958 B2 | 11/2007 | Borkowski et al. |
| 7,324,824 B2 | 1/2008 | Smith et al. |
| 7,376,099 B2 | 5/2008 | Tseng et al. |
| 7,379,447 B2 * | 5/2008 | Dunagan et al. ............... 370/350 |
| 7,388,849 B2 | 6/2008 | Kim et al. |
| 7,395,073 B2 | 7/2008 | Gwon et al. |
| 7,418,523 B2 | 8/2008 | Pettyjohn et al. |
| 7,428,523 B2 | 9/2008 | Tsang et al. |
| 7,451,365 B2 | 11/2008 | Wang et al. |
| 7,496,059 B2 | 2/2009 | Yoon |
| 7,522,537 B2 * | 4/2009 | Joshi ........................... 370/254 |
| 7,609,641 B2 * | 10/2009 | Strutt et al. ................... 370/238 |
| 7,720,016 B2 * | 5/2010 | Tsang et al. ................... 370/310 |
| 2003/0126291 A1 | 7/2003 | Wang et al. |
| 2003/0142624 A1 | 7/2003 | Chiussi et al. |
| 2003/0157951 A1 | 8/2003 | Hasty |
| 2003/0161268 A1 | 8/2003 | Larsson et al. |
| 2003/0179742 A1 | 9/2003 | Ogier et al. |
| 2003/0193908 A1 * | 10/2003 | Cain ........................... 370/330 |
| 2003/0212821 A1 | 11/2003 | Gillies |
| 2003/0212941 A1 * | 11/2003 | Gillies et al. ................... 714/726 |
| 2003/0224787 A1 * | 12/2003 | Gandolfo ...................... 455/434 |
| 2004/0109428 A1 * | 6/2004 | Krishnamurthy ............ 370/338 |
| 2004/0147223 A1 * | 7/2004 | Cho ............................ 455/41.2 |
| 2004/0192713 A1 | 7/2004 | Cho |
| 2004/0152416 A1 | 8/2004 | Dahl |
| 2004/0198375 A1 | 10/2004 | Schwengler et al. |
| 2004/0229566 A1 | 11/2004 | Wang et al. |
| 2005/0002366 A1 | 1/2005 | Toskala et al. |
| 2005/0026621 A1 * | 2/2005 | Febvre et al. ................. 455/450 |
| 2005/0083971 A1 | 4/2005 | Delaney et al. |
| 2005/0090266 A1 | 4/2005 | Sheynblat |
| 2005/0111475 A1 | 5/2005 | Borkowski et al. |
| 2005/0141453 A1 | 6/2005 | Zhu |
| 2005/0190770 A1 * | 9/2005 | Saniee et al. ............... 370/395.4 |
| 2005/0201315 A1 | 9/2005 | Lakkis |
| 2005/0201340 A1 * | 9/2005 | Wang et al. ................... 370/337 |
| 2005/0201346 A1 | 9/2005 | Wang et al. |
| 2005/0221752 A1 * | 10/2005 | Jamieson et al. ............... 455/1 |
| 2005/0232179 A1 | 10/2005 | daCosta et al. |
| 2006/0104205 A1 * | 5/2006 | Strutt et al. ................... 370/238 |
| 2006/0104292 A1 | 5/2006 | Gupta et al. |
| 2006/0128402 A1 | 6/2006 | Lee et al. |
| 2006/0182142 A1 | 8/2006 | Schmidt |
| 2006/0198339 A1 | 9/2006 | Marinier et al. |
| 2006/0215583 A1 | 9/2006 | Castagnoli |
| 2006/0215593 A1 | 9/2006 | Wang |
| 2006/0240843 A1 | 10/2006 | Spain et al. |
| 2006/0253747 A1 | 11/2006 | Gillies |
| 2006/0268908 A1 | 11/2006 | Wang |
| 2007/0049342 A1 | 3/2007 | Mayer et al. |
| 2007/0076673 A1 * | 4/2007 | Joshi ........................... 370/338 |
| 2007/0076697 A1 | 4/2007 | Huotari et al. |
| 2007/0110102 A1 | 5/2007 | Yagyuu et al. |
| 2007/0159991 A1 | 7/2007 | Noonan et al. |
| 2007/0201421 A1 | 8/2007 | Huseth |
| 2007/0211682 A1 | 9/2007 | Kim et al. |
| 2007/0247367 A1 | 10/2007 | Anjum et al. |
| 2007/0247368 A1 | 10/2007 | Wu |
| 2007/0258508 A1 | 11/2007 | Werb et al. |
| 2007/0294226 A1 | 12/2007 | Chahal et al. |
| 2008/0031169 A1 | 2/2008 | Shi |
| 2008/0032705 A1 | 2/2008 | Patel |
| 2008/0037723 A1 | 2/2008 | Milstein et al. |
| 2008/0069071 A1 * | 3/2008 | Tang ........................... 370/342 |
| 2008/0080378 A1 * | 4/2008 | Kim et al. ..................... 370/234 |
| 2008/0192713 A1 | 8/2008 | Mighani et al. |
| 2008/0259895 A1 | 10/2008 | Habetha et al. |
| 2009/0073924 A1 * | 3/2009 | Chou ........................... 370/328 |

FOREIGN PATENT DOCUMENTS

| | | |
|---|---|---|
| WO | 2004104722 | 12/2004 |
| WO | 2004104850 | 12/2004 |
| WO | 2007/143554 | 12/2007 |
| WO | 2008/070871 | 6/2008 |

OTHER PUBLICATIONS

International Search Report for PCT/US07/69031 dated Jan. 22, 2008.

Tang et al., "Hop Reservation Multiple Access (HRMA) for Multichannel Packet Radio Networks," IEEE Computer Communications Networks, 1998 Proceedings, 7th International Conference, p. 388-395, Oct. 12-15, 1998.

Tang et al., "A Protocol for Topology-Dependent Transmission Scheduling in Wirelss Networks," IEEE Wireless Communication and Networking Conference 1999 (WCNC '99), p. 1333-1337 Sep. 1999.

Bao et al., "Collision-Free Topology-Dependent Channel Access Scheduling," Oct. 22, 2000-Oct. 25, 2000, Milcom 2000. 21st Century Military Communication Conference Proceedings, vol. 1, pp. 507-511.

Bao et al., "Distributed dynamic access scheduling for ad hoc networks," Journal of Parallel and Distributed Computing, Apr. 13, 2003, Elsevier Science, vol. 63, Issue 1, pp. 3-14.

Tang et al., "Interference-Aware Topology Control and QoS Routing in Multi-Channel Wireless Mesh Networks, 2005, International Symposium on mobile Ad Hoc Networking and Computing," Proceedings of the 6th ACM International Symposium on Mobile ad hoc networking and computing, pp. 68-77.

Written Opinion for PCT/US07/69031 mailed Jan. 22, 2008 (pp. 1-4).

Alicherry, Mansoor et al., "Joint Channel Assignment and Routing for Throughput Optimization in Multi-radio Wireless Mesh Networks," MobiHoc'05, pp. 58-72 (Aug. 28-Sep. 2, 2005).

Bahl, Paramvir et al., "SSCH: Slotted Seeded Channel Hopping for Capacity Improvement in IEEE 802.11 Ad-Hoc Wireless Networks," MobiCom'04, pp. 216-230 (Sep. 26-Oct. 1, 2004).

Kodialam, Murali et al., "Characterizing Achievable Rates in Multi-Hop Wireless Mesh Networks With Orthogonal Channels," IEEE/ACM Transactions on Networking, 13(4):868-880 (Aug. 2005).

Kodialam, Murali et al., "Characterizing the Capacity Region in Multi-Radio Multi-Channel Wireless Mesh Networks," MobiCom'05, pp. 73-87 (Aug. 28-Sep. 2, 2005).

Mishra, Arunesh et al., "Weighted Coloring based Channel Assignment for WLANs," Mobile Computing and Communications Review, 9(3):19-31 (2005).

Ramachandran, Krishna N. et al., "Interference-Aware Channel Assignment in Multi-Radio Wireless Mesh Networks," Proceedings IEEE Infocom, pp. 1-12 (Apr. 2006).

Raman, Bhaskaran, "Channel Allocation in 802.11-based Mesh Networks," Proceedings IEEE Infocom, pp. 1-10 (2006).

Raniwala, Ashish et al., "Architecture and Algorithms for an IEEE 802.11-Based Multi-Channel Wireless Mesh Network," IEEE, 2223-2234 (2005).

Raniwala, Ashish et al., "Centralized Channel Assignment and Routing Algorithms for Multi-Channel Wireless Mesh Networks," Mobile Computing and Communications Review, 8(3):50-65 (2004).

So, Jungmin et al., "Multi-Channel MAC for Ad Hoc Networks: Handing Multi-Channel Hidden Terminals Using a Single Transceiver," MobiHoc'04, pp. 222-223 (May 24-26, 2004).

Tang et al., "Interference-Aware Topology Control and QoS Routing in Multi-Channel Wireless Mesh Networks, 2005, International Symposium on mobile Ad Hoc Networking and Computing, " Proceedings of the 6th ACM International Symposium on Mobile ad hoc networking and computing, pp. 68-77 (May 25-27, 2005).

\* cited by examiner

*Primary Examiner* — Duc M Nguyen

(74) *Attorney, Agent, or Firm* — McDonnell Boehnen Hulbert & Berghoff LLP

(57) ABSTRACT

A wireless communication system is provided that has at least three nodes arranged in a multi-hop ultra wide band (UWB) communication network such that communications from a first node destined for a third node pass through a second node. Each of the devices in the system includes a radio and a media access control ("MAC") module that is configured to establish multi-hop UWB wireless communications between the three or more wireless communication devices that enables high bandwidth applications such as Voice Over Internet Protocol ("VoIP"); multiplayer gaming; Wireless High Definition Television; and Internet Protocol Television ("IPTV") among others. The MAC module is configured to avoid bandwidth reservation conflicts so that network performance does not degrade as the number of hops or the number of nodes in the wireless communication system increases. The MAC also facilitates utilization of multiple channels to maximize the available spectrum and is further configured to dynamically switch between channels to maximize throughput and meet or exceed quality of service ("QoS") requirements such that QoS is guaranteed and network resources are efficiently utilized.

52 Claims, 8 Drawing Sheets

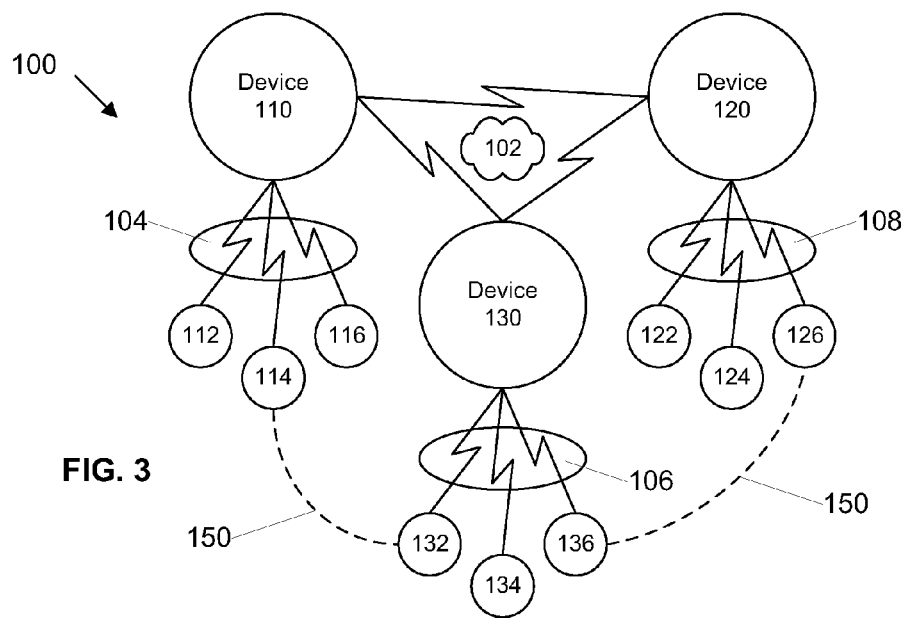
FIG. 3
| DEST | NEXT HOP | HOPS | CHANNEL | POWER |
|------|----------|------|---------|-------|
| 112 | X | 0 | 11 | 1/8 |
| 122 | 110 | 2 | 6 | 1/8 |
| 132 | 110 | 2 | 1 | 1/4 |
FIG. 4
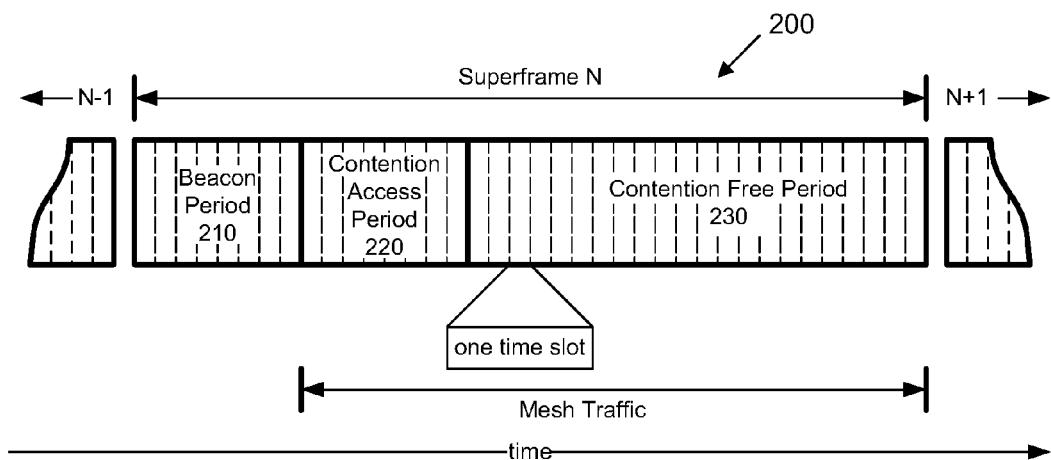
FIG. 5

MULTI-HOP ULTRA WIDE BAND WIRELESS NETWORK COMMUNICATION

RELATED APPLICATION

The present application is a continuation-in-part of U.S. patent application Ser. No. 10/816,481 filed on Apr. 1, 2004 now abandoned, which is a continuation-in-part to Ser. No. 10/437,128 filed May 13, 2003 and Ser. No. 10/437,129 filed May 13, 2003, which both claim the benefit of 60/380,425 filed May 13, 2002;
Ser. No. 11/076,738 filed Mar. 9, 2005 now abandoned which claims priority to Ser. No. 10/816,481 filed Apr. 1, 2004, which is a continuation-in-part of Ser. Nos. 10/437,128 and 10/437,129, which both claim the benefit of 60/380,425 filed May 13, 2002;
Ser. No. 11/420,668 filed on May 26, 2006, which claims the benefit of 60/747,409 filed May 16, 2006, and Ser. No. 11/420,668 is further a continuation-in-part of Ser. No. 11/076,738 filed Mar. 9, 2005, which is a continuation-in-part of Ser. No. 10/816,481 filed Apr. 1, 2004, which is a continuation-in-part of Ser. Nos. 10/437,128 and 10/437,129 which both claim the benefit of provisional 60/380,425; and
Ser. No. 11/462,663 filed on Aug. 4, 2006, which is a continuation-in-part to Ser. No. 10/816,481 filed Apr. 1, 2004 which is a continuation-in-part of Ser. No. 10/437,128 and 10/437,129, which both claim the benefit of 60/380,425 filed May 13, 2002, and Ser. No. 11/462,663 is also a continuation-in-part of Ser. No. 11/076,738 filed Mar. 9, 2005, which claims priority to Ser. No. 10/816,481 filed Apr. 1, 2004, and Ser. No. 11/462,663 is also a continuation-in-part of Ser. No. 11/420,668 filed May 26, 2006 which claims the benefit of 60/747,409 filed May 16, 2006, and Ser. No. 11/420,668 is further a continuation-in-part of Ser. No. 11/076,738 filed Mar. 9, 2005, which is a continuation-in-part of Ser. No. 10/816,481 filed Apr. 1, 2004, which is a continuation-in-part of Ser. Nos. 10/437,128 and 10/437,129 which both claim the benefit of provisional 60/380,425, each of which is incorporated herein by reference in its entirety.

BACKGROUND

1. Field of the Invention

The present invention is generally related to wireless communications and more particularly related to multi-hop wireless network communications over high bandwidth ultra-wide band ("UWB") wireless communication channels.

2. Related Art

In recent times, UWB technology has gone through significant progress. Many different competing proposals for UWB networking have been consolidated into two major camps. The first proposal falls under the WiMedia umbrella and the second proposal falls under the UWB Forum umbrella. UWB communication technologies hold the promise of high speed transmission rates over short distances. However, to geographically extend the coverage of UWB networks without compromising the high speed transmission rates, multi-hop wireless network communications are needed.

Conventional UWB implementations employ a medium access control ("MAC") protocol, for example the IEEE 802.15.3 MAC or the WiMedia MAC (including the multi-band OFDM alliance ("MBOA") MAC) that can be used under the UWB Forum umbrella or the WiMedia umbrella. However, a significant drawback of these conventional solutions for UWB communications is that they lack scalability in a multi-hop network communication environment.

Furthermore, multi-hop wireless network communications over mesh networks have significant challenges with respect to reservation based wireless mesh networking for time division multiple access ("TDMA"), code division multiple access ("CDMA"), orthogonal frequency division multiplexing ("OFDM") and their hybridization with carrier sense multiple access/collision avoidance ("CSMA/CA") schemes in single channel or multiple channel environments. Some of these challenges include the need for routing and resource allocation to be together, which significantly complicates these aspects. The routing process needs to find a path with a load balancing and quality of service ("QoS") guarantee while the resource allocation process depends on how real time traffic flows are distributed within the mesh network.

Additionally, conventional techniques suffer from instability in the direct links between two nodes due to variable transmission rates and multi-hop networking as well as low throughput due to the larger interference range of direct links. Even further complicating matters are the challenges associated with configuring internet protocol ("IP") addresses for these multi-hop wireless network communications over mesh networks. Therefore, what is needed is a system and method that overcomes these significant problems found in the conventional systems as described above.

SUMMARY

Accordingly, described herein are systems and methods for multi-hop wireless network communications over high bandwidth UWB wireless communication channels. The wireless communication system has at least three nodes arranged in a multi-hop UWB communication network such that communications from a first node destined for a third node pass through a second node. Each of the devices in the system includes a radio and a MAC module that is configured to establish multi-hop UWB wireless communications between the three or more wireless communication devices that enables high bandwidth applications such as Voice Over Internet Protocol ("VoIP"); multiplayer gaming; Wireless High Definition Television; and Internet Protocol Television ("IPTV") among others. The MAC module is configured to avoid bandwidth reservation conflicts so that network performance does not degrade as the number of hops or the number of nodes in the wireless communication system increases. The MAC also facilitates utilization of multiple channels to maximize the available spectrum and is further configured to dynamically switch between channels to maximize throughput and meet or exceed quality of service ("QoS") requirements such that QoS is guaranteed and network resources are efficiently utilized.

Additionally, a virtual multi-hop mesh networking ("VMesh") solution is provided that integrates layer-2 routing with the MAC module such that routing and distributed resource allocation are performed together. The VMesh is additionally rate adaptive and takes into account both direct links and virtual multi-hop links between nodes when establishing a routing path and then resource allocation considers the variable link capacity. Moreover, no IP address configuration is needed because the solution operates at the MAC layer such that MAC addressing is employed.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 3 is a network diagram illustrating an example wireless network with a hybrid topology according to an embodiment of the present invention;

FIG. 4 is a block diagram illustrating an example neighbor list according to an embodiment of the present invention;

FIG. 5 is a block diagram illustrating an example MAC protocol superframe according to an embodiment of the present invention;

DETAILED DESCRIPTION

Figure 1:
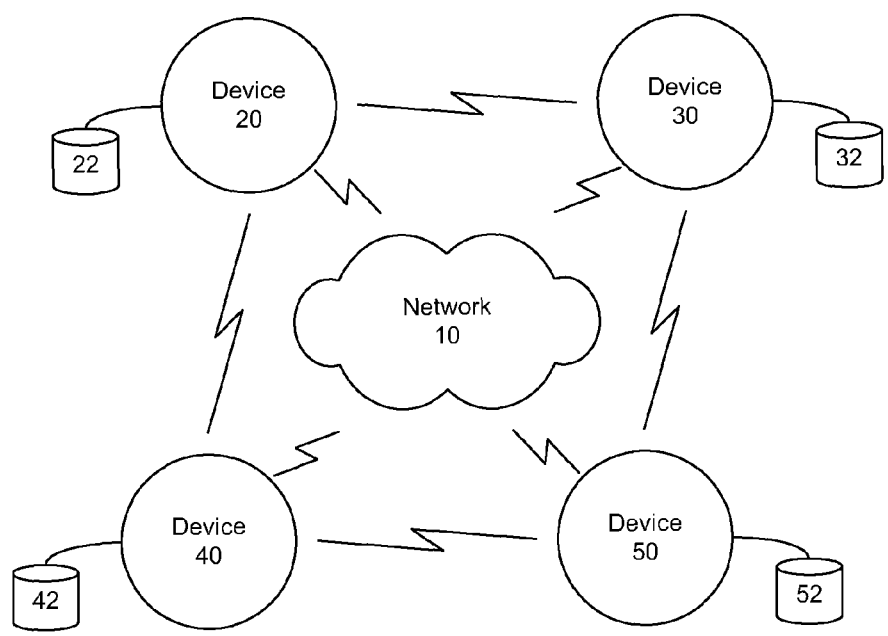
FIG. 1 is a network diagram illustrating an example wireless network with a mesh topology according to an embodiment of the present invention.

Certain embodiments as disclosed herein provide for multi-hop wireless network communications over high bandwidth UWB wireless communication channels. In one embodiment, the nodes involved in the multi-hop wireless communications are arranged in a mesh network topology. For example, one method as disclosed herein allows for the MAC module to determine the network topology by parsing beacon signals received from neighbor nodes within communication range and establish UWB wireless communication channels with those nodes that are within high bandwidth communication range. Applications that require a certain quality of service level may then establish a multi-hop end-to-end route over the mesh network where each link in the route provides the necessary UWB wireless communication channels.

After reading this description it will become apparent to one skilled in the art how to implement the invention in various alternative embodiments and alternative applications. To facilitate a direct explanation of the invention, the present description will focus on an embodiment where communication is carried out over a multi-hop wireless communication network with UWB communication channels, although the invention may be applied in alternative networks including 802.11, 802.15, 802.16, worldwide interoperability for microwave access ("WiMAX") network, wireless fidelity ("WiFi") network, wireless cellular network (e.g., wireless wide area network ("WAN")), Piconet, ZigBee, Bluetooth, IP multimedia subsystem ("IMS"), unlicensed mobile access ("UMA"), generic access network ("GAN"), and/or any other wireless communication network topology or protocol. Furthermore, the described embodiment may be implemented over a 60 gigahertz WirelessHD ("WiHD") communication channel such as can be used to support the delivery of high definition television content or other very high bandwidth application. Additionally, the described embodiment will also focus on a single radio embodiment although multi-radio embodiments and other multiple input multiple output ("MIMO") embodiments are certainly contemplated by the broad scope of the present invention. Therefore, it should be understood that the embodiment described herein is presented by way of example only, and not limitation. As such, this detailed description should not be construed to limit the scope or breadth of the present invention as set forth in the appended claims.

As used herein, UWB communications may include a variety of alternative implementations. For example, the physical layer of WiMedia is based on the MBOA ("MBOA-UWB") or multi-band OFDM UWB while the physical layer of the UWB Forum is based on direct sequence UWB ("DS-UWB"). The major difference between MBOA-UWB and DS-UWB is that MBOA-UWB splits the entire UWB spectrum into several bands during which orthogonal frequency division multiplexing ("OFDM") is used. Additionally, as used herein, UWB communications may also employ alternative MAC layer implementations. For example, the WiMedia MAC, as defined in ECMA-368, includes both CSMA/CA in the prioritized contention access ("PCA") period and time division multiple access ("TDMA") in the contention free period. A superframe in the MAC defined by the UWB Forum, as specified in IEEE 802.15.3, includes of a contention access period ("CAP") and channel time allocation period ("CTAP"). In CAP, CSMA/CA is used, while slotted Aloha and TDMA are used in the CTAP. Accordingly, as used herein, UWB communications include any underlying physical layer and MAC layer implementations.

FIG. 1 is a network diagram illustrating an example wireless network 10 with a mesh topology according to an embodiment of the present invention. In the illustrated embodiment, the network 10 comprises four wireless communication device (also referred to herein as "nodes"), namely devices 20, 30, 40, and 50. Each node is configured with a data storage area, namely data storage areas 22, 32, 42, and 52. Each of the devices is in wireless communication range with one or more other devices in the network 10.

The network 10 can be a personal area network ("PAN"), local area network ("LAN"), wide area network ("WAN"), or a distributed combination of networks collectively comprising a global communications network such as the Internet. Network 10 can be fixed in location, mobile, or may comprise a combination of fixed and mobile components. Additionally, network 10 may carry communications corresponding to a single network protocol or to multiple network protocols. For example, network 10 may be a UWB network for carrying high bandwidth wireless traffic. In one embodiment, the network 10 may be a UWB network organized in a peer-to-peer ("P2P") topology, a star network topology, a mesh network topology, a piconet topology, or any other sort of network topology. Additionally, the network 10 may periodically and dynamically change from one topology to another topology as wireless nodes change relative locations. In an alternative embodiment, the network 10 may also be a wired network.

Furthermore, the network 10 may be employed to implement any of a variety of applications. Advantageously, the network 10 is configurable for high bandwidth traffic so the types of applications that can run over the network 10 are not limited and include, for example, applications such as: data, voice, video, triple-play, multimedia, high definition video, VoIP, video conferencing, video games, multi-player video games with piggy-backed VoIP, general internet browsing, and client-server applications, just to name a few.

In this detailed description, a wireless communication device such as device 20 may also be referred to as a network device, device, network node, node, wireless device, or wireless node. Although various names may be used herein, a wireless device may comprise all or a minimal subset of the components and functional capabilities described herein, fore example those features described with respect to FIGS. 6-9, 16 and 17.

Notably, the wireless communication devices such as device 20 can be any of a variety of wireless communication devices including but not limited to a laptop computer, cell phone, personal digital assistant ("PDA"), game console, wireless TV set and set-top box, radio frequency identification (RFID) device, or any of a variety of stationary or mobile devices with which communication is desirable.

Additionally illustrated in FIG. 1 are several wireless communication links (not labeled) between the various nodes. In one embodiment, a plurality of links together comprises a path between the two terminal nodes.

Figure 2:
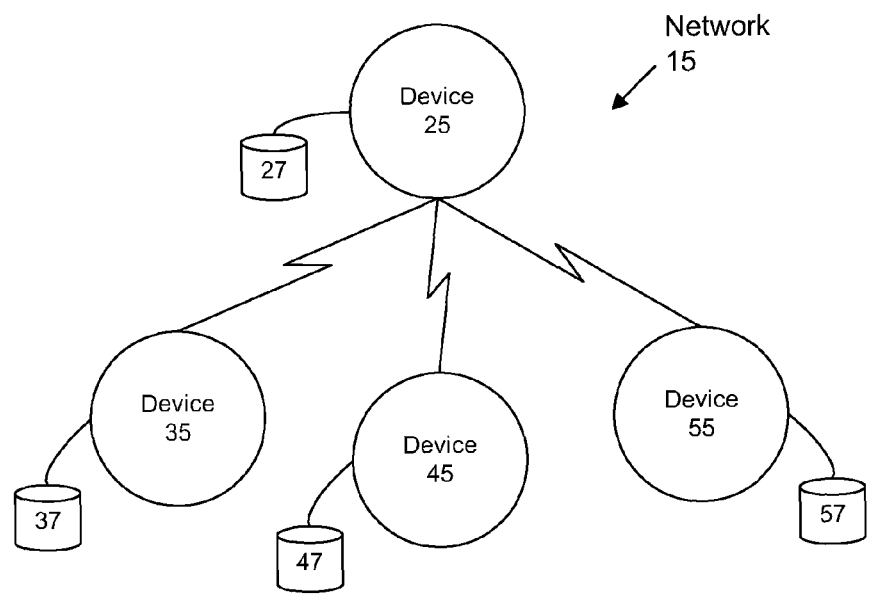
FIG. 2 is a network diagram illustrating an example wireless network with a piconet topology according to an embodiment of the present invention.

FIG. 2 is a network diagram illustrating an example wireless network 15 with a piconet topology according to an embodiment of the present invention. In the illustrated embodiment, the piconet 15 comprises nodes 25, 35, 45, and 55. Each node is configured with a data storage area, namely data storage areas 27, 37, 47, and 57. As will be understood by those having skill in the art, node 25 is considered the piconet controller ("PNC") and is responsible for maintaining communications between all of the nodes in the network 15. In one embodiment, the piconet 15 operates in accordance with the IEEE 802.15.3 standard and may employ Bluetooth or other communication links between the various nodes in the piconet 15.

FIG. 3 is a network diagram illustrating an example wireless network 100 with a hybrid topology according to an embodiment of the present invention. In the illustrated embodiment, the network 100 comprises a mesh network 102 between nodes 110, 120, and 130. These nodes cooperatively communicate with each other and various other nodes to provide a dynamic wireless communication network 100 that enables each node to communicate directly or indirectly with each other.

Additionally, the illustrated embodiment comprises piconet networks 104, 106, and 108. Piconet 102 comprises nodes 110 as the PNC and nodes 112, 114, and 116. Similarly, the PNC for piconet 106 is node 130 and its other member nodes are 132, 134, and 136. The PNC for piconet 108 is node 120 and its other member nodes are 122, 124, and 126. Although not shown, each node in the figure can be configured with a data storage area.

Also illustrated are optional communication links 150 that provide direct communication between member nodes of different piconets. Although not shown in FIG. 3, there may be multi-hop routes between nodes that are in a single piconet. For example, a node 113 (not illustrated) may be in communication solely with node 112 and thereby be included in piconet 104 and accessible via a communication path including more than one hop.

In alternative embodiments, disparate network topologies other than piconets and mesh networks may be merged into a single wireless network such as network 100. Advantageously, the nodes in these disparate topologies can employ the MAC module described herein to facilitate high bandwidth communications by forming a mesh network or employing the communication capabilities of the MAC module within existing topologies.

In an alternative embodiment, nodes using different broadband wireless communication technologies may be merged into a single wireless network such as network 100. For example, node 112 may be a UWB device, node 122 may be a WiFi device, and node 132 may be a WiMAX device. It is anticipated that such different wireless communication technologies will overlap in their use of frequency in the future and as such, various nodes employing different technologies may cause interference with each other. Accordingly, integrating the various nodes using different technologies into a single network 100 precludes frequency interference by providing a common communication framework over the various frequencies, channels, and timeslots employed by the various devices. The single network 100 additionally provides the advantage of allowing all of the nodes using different broadband wireless communication technologies to communicate with each other.

For example, UWB radios are expected to use all frequency bands from 3.1 GHz up to 10.6 GHz. These frequency bands overlap with the frequency bands used by WiFi radios and WiMAX radios. Advantageously, the single network 100 allows nodes employing a diverse set of broadband wireless networking technologies to coexist and communicate with each other, successfully meeting the needs of different users and different applications. In one embodiment, nodes 110, 120, and 130 in the hybrid network 100 provide a bridging capability between the different wireless communication technologies through a separate interface for each, such as UWB, WiFi, and WiMAX. Accordingly, a multi-hop path can be formed using WiFi links, UWB links, WiMAX links, or any combination of these and other communication links. Advantageously, the scalable MAC module on each node employs layer-2 routing to identify the appropriate communication technology for each link and uses that as a parameter or property for the link to form a hybrid path that satisfies the QoS requirements of the end-to-end nodes that are in communication with each other, whether using best effort traffic or real-time transmission traffic.

In yet another embodiment, the network 100 comprises networks 102, 104, 106, and 108 and each of these networks is a discrete network. For example, network 104 may be a wireless WAN operated by a carrier while network 106 is a wireless LAN in a home environment. Advantageously, the scalable MAC module allows node 132 to communicate directly with node 114 if the two nodes are in proximity of each other.

Additionally, node 132 can be a mobile device and thereby when it moves from one location to another the scalable MAC allows node 132 to roam between the wireless LAN 106 and the wireless WAN 104. The roaming between network 106 and network 104 may be accomplished through beaconing with a node in network 104 when node 132 comes into proximity with such a node. The roaming between network 106 and network 104 may also be accomplished through communications with node 110. For example, the network 104 may have an access point topology where each node in the network 104 communicates through the node 110. Such dynamic switching between wireless networks is advantageously facilitated by the scalable MAC module and its use of beaconing to identify its network topology and neighbor list and can be employed between networks with no centralized controller (such as two mesh networks) or networks with a centralized controller (such as a piconet), or any combination of networks with or without a centralized controller.

Alternatively, a node such as node 126 may be simultaneously communicatively coupled with network 106 and network 108, for example, when node 126 is in range of both networks. In such an embodiment, node 126 may establish a first communication channel that is configured for communications on network 108 and a second communication channel that is configured for communications on network 106. Accordingly, the node 126 can simultaneously communicate on both discrete networks 106 and 108 by dedicating a separate communication channel to each network. In one embodiment, the node 126 may be communicatively coupled with a plurality of discrete networks via a plurality of separate communication channels.

FIG. 4 is a block diagram illustrating an example neighbor list according to an embodiment of the present invention. Advantageously, a node in a mesh network may maintain a routing table of nodes that it is aware of. The routing table preferably contains useful information such as the number of hops to reach the destination node, the very next hop in the path to reach the destination node, a preferred communication channel for the destination node, and a power level for the destination node. The power level preferably indicates the power level at which to broadcast packets when initiating communications with the recipient node. Additional information may also be included in the neighbor list, for example the signal-to-noise ratio ("SNR"), the signal strength, and other useful information.

In one embodiment, as nodes join a network such as network 100 shown in FIG. 3, the nodes receive beacon signals from the other nodes in the network. A new node can parse the beacon signals and populate its neighbor list accordingly. For example, all of the nodes that send a beacon signal are considered to be neighbor nodes because their beacon signals are within range of the new node. However, some beacon signals that are received may be discarded if the signal strength of the beacon is too low to support high bandwidth communications, for example, UWB communications.

FIG. 5 is a block diagram illustrating an example MAC protocol superframe 200 according to an embodiment of the present invention. In the illustrated embodiment, the superframe 200 comprises a beacon period ("BP") 210, contention access period ("CAP") 220, and a contention free period ("CFP") 230. The portions of the superframe 200 are shown as divided up into a plurality of timeslots. In one embodiment, the number of timeslots in each period is adjustable and controlled by the scalable multi-hop MAC module. Additionally, the length of each individual timeslot can depend on whether the underlying radio is WiMedia or IEEE 802.15.3 based.

One advantage of arranging the superframe into the BP, CAP, and CFP is that this organization is also followed by both the WiMedia MAC and the IEEE 802.15.3 MAC. For example, the superframe 200 allows the use of carrier sense multiple access/collision avoidance ("CSMA/CA") in the CAP combined with the use of TDMA in the CFP. Because the CAP uses CSMA/CA, it is compatible with both WiMedia and IEEE 802.15.3 and the periods can be easily aligned since period timing information is provided in the beacon signals which are analyzed by the scalable MAC module.

Additionally, during the CFP, in order to avoid collisions with nodes employing WiMedia or IEEE 802.15.3, connection setup or tear down messages follow the packet formats defined in WiMedia or IEEE 802.15.3 MAC so that nodes using WiMedia or IEEE 802.15.3 MACs are made aware of the timeslot allocation for nodes using the scalable MAC module and vice versa. Thus, when no timeslot conflicts are present, nodes using the presently described scalable MAC module can communicate with both WiMedia nodes and IEEE 802.15.3 nodes in a UWB or other high bandwidth network.

During the beacon period, signaling messages are passed around among the nodes in the wireless network. Each node sends a beacon signal during this period so that new nodes joining the network can identify the set of neighbor nodes. The beacon signal includes information about the sender node as well as information from its own neighbor list to facilitate the propagation of network topology information to all nodes in the network.

During the contention access period, the nodes in the network collaboratively assign timeslots for communication during the contention free period and identify routes where necessary for reliable end-to-end communications. The assignment of timeslots amongst the nodes is done in an interleaved fashion in order to optimize the use of spectrum amongst all nodes in the network and ensure the highest throughput and quality of service.

During the contention free period, the nodes in the network send and receive data communications during the various timeslots under a TDMA paradigm.

Figure 6:
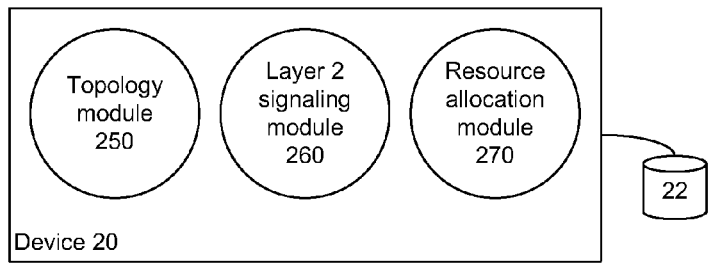
FIG. 6 is a block diagram illustrating an example wireless communication device according to an embodiment of the present invention.

FIG. 6 is a block diagram illustrating an example wireless communication device 20 according to an embodiment of the present invention. In the illustrated embodiment, the node 20 comprises a topology module 250, a layer-2 signaling module 260, and a resource allocation module 270. As previously described, the node 20 can be any sort of wireless communication device.

In one embodiment, the various modules shown in the figure can be incorporated into a MAC module that implements layer-2 communications on a wireless network. Advantageously, the MAC module is scalable because the network topology is formed with links having the best link quality. Accordingly, adding new nodes with high quality links does not introduce decreased performance levels to the network. Additionally, distributed TDMA is guaranteed to have no conflict of resource allocation and layer-2 routing is incorporated into the resource allocation process for both best effort and real-time transmission traffic. Advantageously, the MAC module can be implemented in software for deployment on off-the-shelf UWB chipsets or it can be embedded into the MAC sublayer of the UWB chipsets such that the UWB chipsets are shipped with mesh-ready functionality.

The topology module 250 is configured to align the node's beacon signal with the mesh network. In one embodiment, when a UWB node joins a mesh network, the topology module 250 accomplishes alignment of the node's beacon signal with the mesh network by receiving and analyzing beacon signals from other nodes within wireless communication range and developing and maintaining a neighbor list that describes the current topology of the wireless network. For example, during the beacon period, the topology module 250 may receive five beacon signals. Of the five, perhaps only four are received with sufficient signal quality to be considered a neighbor node. Accordingly, each of the four beacon signals are analyzed by the topology module 250 to identify who the sender node is, what the signal quality is, who the sender node's neighbors are, and other useful information for determining the topology of the wireless network.

One aspect of determining the topology can be described with reference to the discarded fifth beacon signal described above. Since the sender node of that beacon signal is not a direct neighbor, one or more of the four beacon signals with sufficient quality may include the sender of the discarded fifth beacon signal as a neighbor. In such a case, the neighbor list can include the sender of the fifth beacon signal as a multi-hop neighbor with a path (i.e., the node(s) through which communications for the sender of the fifth beacon signal should go) that includes the neighbor with the highest signal strength between it and the sender of the fifth beacon signal. In this fashion, the topology module 250 can identify the various direct and multi-hop nodes within communication range to determine the topology of the wireless network such that high quality high bandwidth communications may take place.

The layer-2 signaling module 260 is configured to send and receive MAC layer control and signaling messages. The layer-2 signaling module 260 also implements optional layer-2 routing. Advantageously, layer-2 signaling and control messages are sent and received in the timeslots in the initial allocation and unicast signaling between nodes is employed by the layer-2 signaling module 260 in order to increase the reliability of signaling and delivery of control messages.

The resource allocation module 270 is configured manage routing for best effort traffic and real-time transmission traffic. In one embodiment, real-time transmission traffic includes data for multimedia applications, for example, audio and video data. Because there are no QoS specifications for best effort traffic, the resource allocation module 270 establishes an end-to-end traffic flow as needed for such traffic. This can be accomplished by setting up a routing path in the MAC layer (i.e., layer-2). Advantageously, resource sharing within neighboring nodes is implemented during resource allocation to provide fair queuing and delivery of best effort traffic.

For real-time transmission traffic, the resource allocation module 270 identifies the QoS requirements and delivery specifications for such traffic and identifies and establishes an end-to-end traffic route for such data. To accomplish this end-to-end route, an admission control process is employed by the resource allocation module 270 to setup a high bandwidth route with sufficient resources allocated to each link in the route. Accordingly, resource allocation is determined when the route is established. Once the route is successfully established, the connection is admitted and data traffic may proceed. If no acceptable route can be established with adequate resources, the route is denied.

Figure 7:
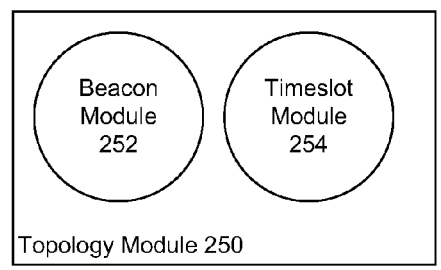
FIG. 7 is a block diagram illustrating an example topology module according to an embodiment of the present invention.

FIG. 7 is a block diagram illustrating an example topology module 250 according to an embodiment of the present invention. In the illustrated embodiment, the topology module 250 comprises a beacon module 252 and a timeslot module 254.

The beacon module 252 is configured to send and receive beacon signals and form the wireless network topology based on information received in the beacon signals from other UWB nodes in the network. Advantageously, the fields and format of the beacon signal can be enhanced to provide additional data that is useful in forming the network topology without introducing any compatibility issues with WiMedia or IEEE 802.15.3 nodes. For example, neighbor node information can be included in the beacon signal as well as signal strength, SNR information, and other useful data.

In one embodiment, when identifying the topology of the network, the beacon module determines the list of neighbor nodes, establishes a reliable high transmission link with each neighbor node, and acquires synchronization with the neighbor nodes. All of these tasks are advantageously performed through beaconing. For example, when a new UWB node joins a network, it receives one or more beacons and checks the signal quality of each. The node sending the beacon signal is added to the neighbor list of the new UWB node and the link quality is examined to determine if a reliable high transmission link can be established. Because the transmission rate in UWB communications is very sensitive to the distance between nodes (and thus the signal strength between nodes) only those links with the best signal quality will be set up. Otherwise stated, communication between nodes that are too far away or do not have reliable links is carried out by multi-hop mesh networking to deliver packets. It should be noted that, although a link between two nodes is setup with the highest transmission rate, its actual transmission rate may vary depending on the environmental conditions at the time of transmission.

In parallel with building the neighbor list and setting up the link, the new node also acquires synchronization information from the network. This information is obtained from the beacon messages. The synchronization information allows the beacon module to align the superframe of the new node with the superframe of the other nodes in the network. The synchronization information also allows the beacon module to align the beacon period, the contention access period, and the contention free period.

The timeslot module 254 is configured to allocate initial timeslots and interleaved timeslots in the contention free period for the new node. Advantageously, the allocation of initial timeslots allows a new node the resources to send packets prior to the actual allocation of interleaved timeslots in the contention free period. Note that before initial timeslot allocation is done, the new node has to send its information by piggybacking information in a beacon message or sending information during the CAP using unreliable CSMA/CA.

The allocation of initial timeslots is particularly important when admission control is needed to establish a reliable transmission route for high QoS traffic, for example with multimedia applications. The allocation of initial timeslots also allows a new node to send reliable signaling messages including MAC and routing related messages. Additionally, the allocation of initial timeslots allows a new node to assist with the interleaving of timeslots allocated to it.

For example, in TDMA if a consecutive block of timeslots are allocated to a single node, the throughput performance may suffer in a multi-hop network. Accordingly, timeslot module 254 is configured to allocate timeslots in an interleaved fashion. To achieve this, the initial timeslots of each node are uniformly distributed in the entire CFP of the superframe. Later, when more timeslots are allocated by the distributed allocation scheme, they can advantageously be selected from the timeslots that immediately following the initial timeslots.

The timeslot module 254 is configured to obtain initial timeslots for the new node that are not in conflict with the timeslots of the other nodes in the network and that are uniformly distributed in the CFP of the superframe. For example, if the number of the initial timeslots for each node is N. In one embodiment, the number of initial timeslots may be implemented as a modifiable system parameter. The number N can also be dynamically determined by assuming that the block size of timeslots (the maximum number of consecutive timeslots allocated to each node) is M; the maximum number of neighbors in the network is K, and total timeslots in the CFP is T, then N=T/(MK).

Once the number of initial timeslots N has been determined, the timeslot module 254 next determines where these initial timeslots can be placed in the CFP for uniform distribution. To determine how best to uniformly distribute the initial timeslots, the new node collects information from neighboring nodes that are up to two-hops away. This information is obtained through beaconing. Based on the collected information, the new node identifies what timeslots have been allocated to its neighbors and selects its initial timeslots from the remaining free timeslots in the CFP. This provides for the initial allocation. The selection process advantageously chooses timeslots that are evenly spaced from each other and separated by other nodes' initial timeslots in order to achieve interleaving and thereby optimal throughput. After the initial timeslots are selected, the new node informs its neighbors within two hops of its reservation of those timeslots. Advantageously, the messages sent to inform neighboring nodes can be sent in the next available initial timeslot. This also provides other new nodes with the timeslot reservation information in order to reduce any conflicts during initial timeslot allocation.

The timeslot module 254 is additionally configured to select timeslots during distributed timeslot allocation for best effort traffic or real-time transmission traffic. As explained before, the initial timeslots are the reference point for selecting additional timeslots in the CFP. In one embodiment, when additional timeslots are allocated to a node, they are selected from the blocks of timeslots following the node's initial timeslots. Since the allocation of initial timeslots is based on topology (e.g., the number of nodes in the network) the number of initial timeslots per node is not optimally distributed—especially when the various nodes have an unbalanced traffic load. For example, one node may have a significant amount of traffic to send while another node may have a very low traffic load. In such a scenario, the high traffic node needs to be assigned more of the timeslots in the CFP. If the blocks of timeslots following the node's initial timeslots do not meet this need, then some of the timeslots assigned to this node can be selected in the blocks of timeslots following other nodes' initial timeslots.

Advantageously, the timeslot module 254 first allocates additional timeslots to a node that all in the blocks that follow the node's initial timeslots because this is most efficient. If additional timeslots are needed, then these timeslots can be reserved from blocks that follow other nodes' initial timeslots.

Figure 8:
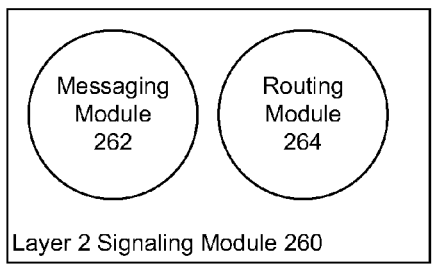
FIG. 8 is a block diagram illustrating an example layer-2 signaling module according to an embodiment of the present invention.

FIG. 8 is a block diagram illustrating an example layer-2 signaling module 260 according to an embodiment of the present invention. In the illustrated embodiment, the signaling module 260 comprises a messaging module 262 and a routing module 264. In one embodiment, the messaging module 262 is configured to handle layer-2 signaling during the initial timeslots, which are those timeslots in the CAP and are allocated such that there is no conflict between transmitting nodes. Thus, signaling messages are sent out with a very high probability of successful delivery. However, because wireless channel errors may still occur, a reliable mechanism is still needed for signaling so that the performance of the layer-2 MAC module is not compromised by unreliable transmission of signaling messages.

In order to accomplish reliable transmission of signaling messages, unicast transmission of signaling messages is implemented by the messaging module 262. For example, when a node needs to send a signaling message to all of its neighbors the messaging module 262 sends the message to each neighbor, one by one, using a unicast message with acknowledgement procedure. While this may appear to increase traffic and introduce delays, the overall effect is actually faster communication because the reliability is guaranteed and less retries are required, for example, when channel quality is poor.

The routing module 264 is configured to identify layer-2 routes for best effort traffic and establish layer-2 routes for real-time transmission traffic. Although the MAC module includes the routing module 264, which is configured to implement layer-2 routing, this layer-2 routing can be turned off as needed. Therefore, it is optional. When layer-2 routing is disabled, the MAC module behaves the same for best effort traffic except that the routing path is setup by the layer 3 routing. Additionally, when layer-2 routing is disabled, the establishing of an end-to-end real-time transmission (admission control), for example for multimedia traffic, is carried out at layer 3. One disadvantage of this is that the route established by layer 3 will likely not provide optimal performance since it is not tied in with resource allocation during setup of the route.

Figure 9:
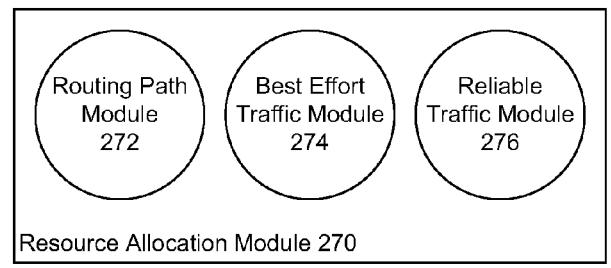
FIG. 9 is a block diagram illustrating an example resource allocation module according to an embodiment of the present invention.

FIG. 9 is a block diagram illustrating an example resource allocation module 270 according to an embodiment of the present invention. In the illustrated embodiment, the resource allocation module 270 comprises a routing path module 272, a best effort traffic module 274, and a real-time transmission traffic module 276.

The routing path module 272 works in cooperation with the best effort traffic module 274 and the real-time traffic module 276 in order to provide on demand routes for best effort traffic and established end-to-end routes for real-time transmission traffic.

The best effort traffic module 274 finds the best routing path on demand for new best effort traffic and performs fair queuing for all best effort traffic flows in each group of neighboring nodes. For example, for best effort data traffic there is no QoS or traffic specification information available for the best effort traffic module 274 to carry out the resource allocation. Thus, there is no need to reserve any timeslots for best effort traffic. Resource allocation for best effort traffic is therefore carried out on demand for all traffic flows rather than per flow.

Once a new traffic flow starts, the best effort traffic module 274 instructs the routing path module 272 to determine the routing path from end to end. In one embodiment, the optimal end to end route can be determined based on minimum hop count and the load of each link. Note that link quality does not need to be considered because the previously described topology module operates to ensure that each link is the best available when it is established. Advantageously, excluding link quality from the routing metrics allows the routing path to be setup with higher stability. And additional advantage of considering the traffic load on each link when determining the routing path is that this inherently provides load balancing across the UWB network.

Additionally, the use of layer-2 routing improves performance because all of the signaling messages related to routing are initiated, sent, received, and processed at the MAC layer. Furthermore, because the initial timeslots for reliable layer-2 signaling are reserved, the routing related messages can be sent and received more quickly and reliably, which greatly improves the overall efficiency of the routing protocol, particularly in a multi-hop mesh network environment.

When an on demand routing path is set up, even if load balancing is considered the actual traffic load on each link is not proportional to the number of timeslots allocated to the link. The traffic load on each link varies depending on the fluctuation of traffic patterns on different flows. Thus, considering any given link on the routing path, its assigned timeslots may not be enough to handle the required traffic load for a particular flow. Accordingly, the resource allocation module 270 employs a fair resource allocation process that periodically adjusts the resource allocation on each node in the network. In on embodiment, this process is triggered by one node in the network and during execution is passed from one node to the next node when the previous node is done.

During fair resource allocation, at each node the traffic load of best effort traffic to different destinations is estimated and the traffic load and timeslots are compared for different links from this node to its neighbors. The timeslots that are more than the traffic load are then released and reassigned to those links with insufficient timeslots. This adjustment takes place across all nodes in the network so that the best effort traffic resources are fairly distributed amongst the nodes and can provide maximum throughput for best effort traffic.

It should be noted that the available timeslots for best effort traffic are those remaining timeslots that are not reserved for real-time transmission traffic. In one embodiment, in order to avoid a situation where best effort traffic has zero timeslots, each superframe maintains a minimum number of timeslots that are reserved for best effort traffic.

The real-time traffic module 276 is configured to handle traffic with certain throughput requirements, i.e., data flows with QoS and traffic specifications. For these types of high priority data flows, end-to-end admission control is employed by the real-time traffic module 276 to provide end-to-end resource reservation at a level that will meet the QoS specification. Because end-to-end transmission relies on an established routing path, the routing path module is employed to identify the end-to-end routing path for the real-time transmission traffic flow. The real-time traffic module 276 operates based on the use of layer-2 routing for packet delivery. If layer-3 routing is used for packet delivery, then the resources that are reserved on the various end-to-end links between nodes in the network may not be used since the layer-3 routing may select an alternative path for delivery of the packets. Thus, to provide QoS support, the real-time traffic module incorporates both routing and timeslot allocation into the same procedure of end-to-end admission control.

In one embodiment, when a UWB mesh node detects the arrival of a new connection, it first determines the QoS and real-time traffic specification of this connection. Next, the end-to-end admission control process is triggered and includes determining the sequence of nodes in the path (e.g., performed by the routing module 272), reserving timeslots for delivery of packets at each node, and sending a reservation failure message from any node or sending a reservation success message from the end node.

For example, the node initiating the admission control process, first maps the QoS and traffic specification onto the number of required timeslots and determines if there are enough available timeslots. If there are, then the routing path module 272 determines which link should be used for sending the data by considering the minimum hop count to the destination. Once the link is determined, the number of required timeslots is allocated to this link (if any reallocation is needed). All neighbor nodes within two hops are then informed of the timeslot allocation to prevent interference.

This process continues at each node in the routing path until sufficient resources have been allocated at each node in the path to the end node. If any node along the path is unable to allocate the required number of timeslots, that node sends a reservation failure message back to the initiating node. The reservation failure message is also passed along to neighbor nodes within two hops so that they can update the status of any previously allocated timeslots along the reserved path as unallocated. When the reservation failure message reaches the initiating node, that node can inform the higher layer protocol or application protocol that the connection failed due to insufficient resources. Alternatively, if reservation is successful from end-to-end, the end node sends a reservation success message back to the initiating node so that the reliable transmission of data may begin.

Accordingly, the real-time traffic module 274 in cooperation with the routing path module 272 establishes an end-to-end routing path and in doing so also allocates sufficient timeslots on each link. Furthermore, this process is carried out in a distributed fashion that does not require coordination of all nodes in the network. This is different from the previously described fair resource allocation for best effort traffic, where timeslot allocation and/or adjustment is coordinated among all nodes in the network. Thus, the difference between fair resource allocation for best effort traffic and end-to-end reservation for real-time traffic delivery is that the connection setup for real-time traffic is performed based on remaining timeslots while the resource allocation/adjustment for best effort traffic is performed by reassignment of timeslots allocated for best effort traffic among all nodes in the interference range (e.g., two hops).

In one embodiment, when a connection is no longer needed, a teardown process can be started from either end node. The teardown process may be implemented by sending a reservation release message from one end node all the way to the other end node following the established routing path. Each node in the path thereby releases the reserved timeslots for the connection and informs their respective neighbors so that the reserved timeslots are released across the network.

Figure 10:
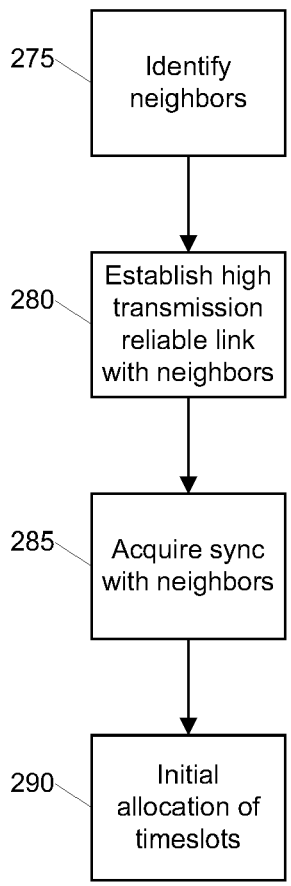
FIG. 10 is a flow diagram illustrating an example process for initializing communications in a wireless network according to an embodiment of the present invention.

FIG. 10 is a flow diagram illustrating an example process for initializing communications in a wireless network according to an embodiment of the present invention. The illustrated process may be carried out by a wireless node in a UWB network, for example the nodes previously described in FIGS. 1, 2, 3, and 6. Initially, in step 275 the node identifies its neighbor nodes. This can be accomplished by receiving and analyzing beacon signals during the beacon period. For those nodes with sufficiently high signal quality, in step 280 the node establishes a high transmission reliable link with each identified neighbor node. Next, in step 285 the node achieves synchronization with the other nodes in the network. This synchronization aligns the superframe of the node with the superframes of the other nodes in the network and aligns the respective beacon periods, contention avoidance periods, and contention free periods. Finally, in step 290 the node allocates its initial timeslots. This is done by determining what timeslots have been allocated by other nodes in the network and then reserving a calculated number of timeslots for the node—with those timeslots being distributed evenly throughout the CFP of the superframe.

Figure 11:
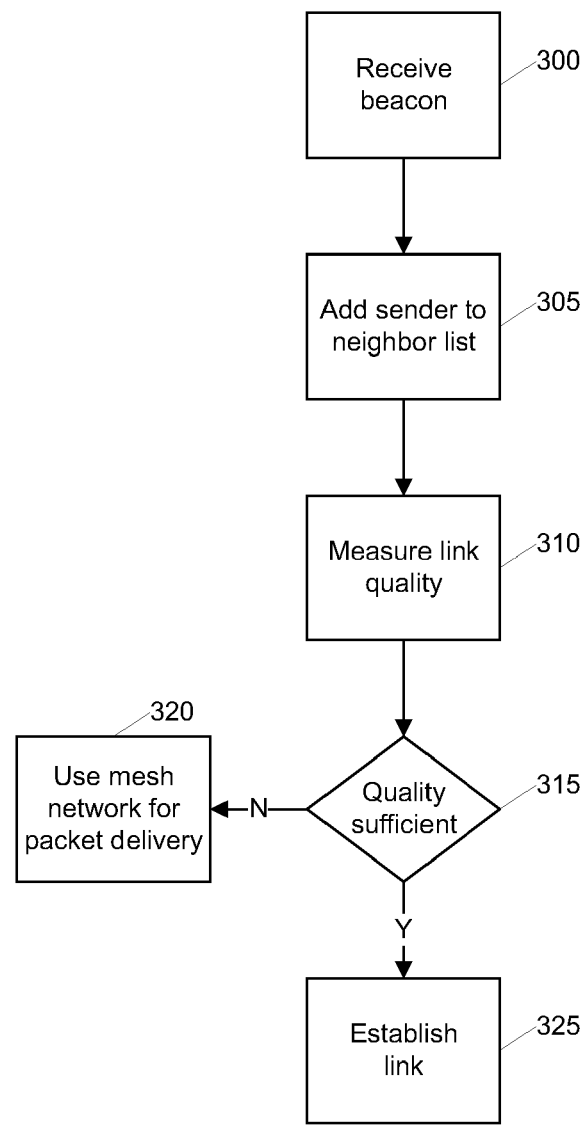
FIG. 11 is a flow diagram illustrating an example process for identifying the topology of a wireless network according to an embodiment of the present invention.

FIG. 11 is a flow diagram illustrating an example process for identifying the topology of a wireless network according to an embodiment of the present invention. The illustrated process may be carried out by a wireless node in a UWB network, for example the nodes previously described in FIGS. 1, 2, 3, and 6. Initially, in step 300 the node receives a beacon signal from another node. Next, in step 305 the node determines who the sender of the beacon signal is and adds that node to the sender list, which can be stored in local data storage on the node. Then in step 310, the node measures the link quality of the beacon signal to determine if the link quality is sufficient for a direct link to be maintained with the node for high bandwidth communication (e.g., UWB communication). If the quality of the link is sufficient, as determined in step 315, then the node establishes a link with the node and updates the neighbor list accordingly. If the quality of the link is poor, then in step 320 the node determines to use the mesh network for delivery of packets to the node that sent the beacon signal and the neighbor list is updated accordingly.

Figure 12:
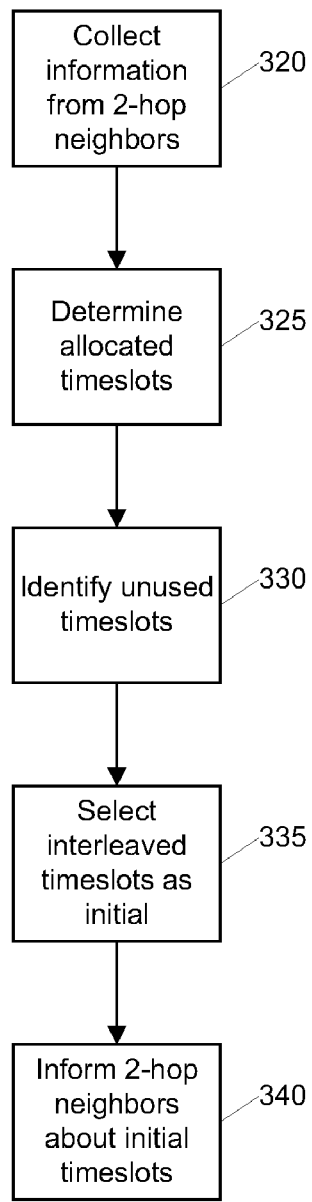
FIG. 12 is a flow diagram illustrating an example process for allocating initial timeslots in a wireless network according to an embodiment of the present invention.

FIG. 12 is a flow diagram illustrating an example process for allocating initial timeslots in a wireless network according to an embodiment of the present invention. The illustrated process may be carried out by a wireless node in a UWB network, for example the nodes previously described in FIGS. 1, 2, 3, and 6. Initially, in step 320 the node collects information from its neighbors within two hops. Collecting the information from the two hop range rather than just the single hop range advantageously allows the node to include those timeslots within interference range in its allocation process. Next, in step 325, the node determines what timeslots are already allocated to nodes in direct communication range (one hope) or nodes in interference range (two hops). As a result, the node is able to identify in step 330 what timeslots are unused. In step 335 the node then selects its initial timeslots, making a point of distributing those timeslots as evenly as possible throughout the contention free period. Once the timeslots have been selected, in step 340 the node informs its neighbors out to the two hop range about the initial timeslots it has allocated to itself. Advantageously, this communication can be sent in the next occurring initial timeslot of the node.

Figure 13:
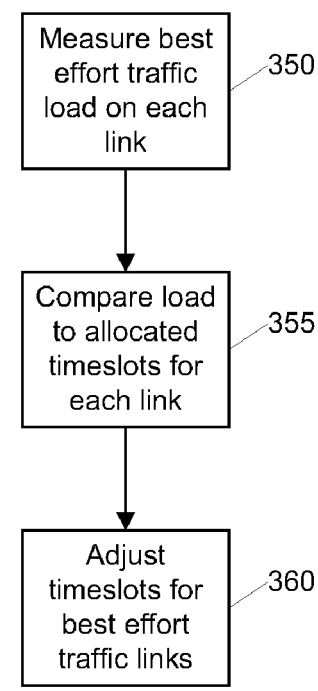
FIG. 13 is a flow diagram illustrating an example process for allocating resources for best effort wireless communication according to an embodiment of the present invention.

FIG. 13 is a flow diagram illustrating an example process for allocating resources for best effort wireless communication according to an embodiment of the present invention. The illustrated process may be carried out by a wireless node in a UWB network, for example the nodes previously described in FIGS. 1, 2, 3, and 6. Initially, in step 350 the node measures the best effort traffic load on each link and then compares the load to the number of allocated timeslots for each link in step 355. Next, in step 360 the node adjusts the timeslots that are available for best effort traffic so that they are optimized in a fashion that those links with the higher best effort traffic load or estimated best effort traffic load have more timeslots allocated to them than those links with less best effort traffic load or estimated best effort traffic load.

Figures 14, 15:
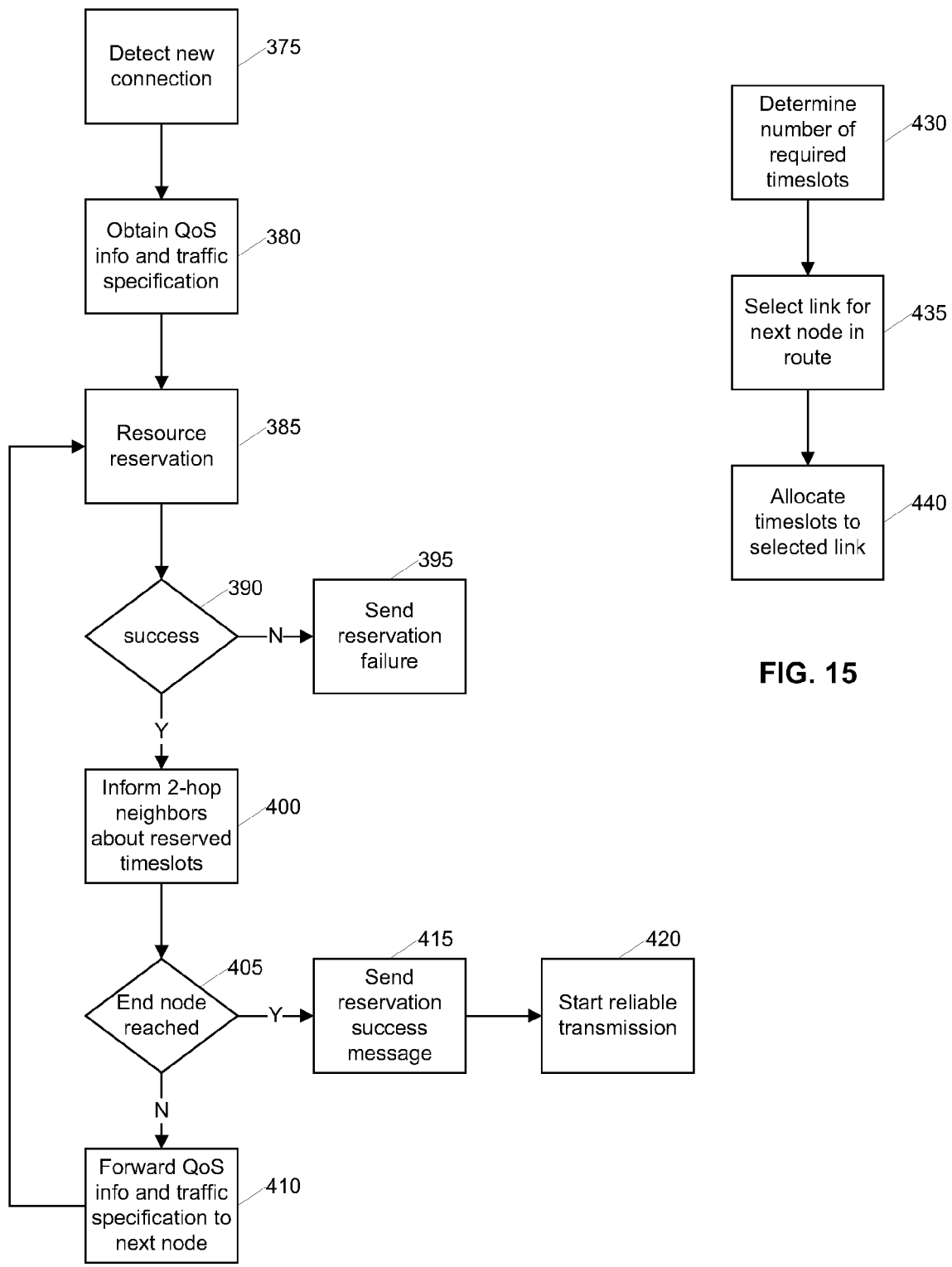
FIG. 14 is a flow diagram illustrating an example process for allocating resources for real-time transmission according to an embodiment of the present invention.
FIG. 15 is a flow diagram illustrating an example process for resource reservation according to an embodiment of the present invention.

FIG. 14 is a flow diagram illustrating an example process for allocating resources for reliable transmission according to an embodiment of the present invention. The illustrated process may be carried out by a wireless node in a UWB network, for example the nodes previously described in FIGS. 1, 2, 3, and 6. Initially, in step 375, the node detects a new connection or a new traffic flow request from a higher layer in the communication stack. For example an application on the device may request to send a large digital image over the network or request to stream an audio/video file such as a movie trailer or full feature film over the network. For such multimedia applications, real-time transmission is desirable to ensure a level of quality that is acceptable to a user of the wireless device and wireless communication medium such as a UWB communication channel.

Next, in step 380 the node obtains the QoS information and traffic specification required for the real-time transmission. This information may be received from the application or higher layer. In step 385 the node then reserves the necessary resources it needs to meet the QoS level by allocating enough timeslots to the link that will be used to send the traffic to the next node in the communication path between this node and the end node. If the resource allocation is successful, as determined in step 390, then the node informs its neighbors out to two hops about the reserved timeslots, as shown in step 400. If, however, the resource allocation was not successful, in step 395 the node sends a reservation failure to inform the upper layer or application that establishing the real-time transmission path failed.

When the node successfully allocates the resources needed to meet the desired QoS level, then in step 405 the node determines if it is the last node in the path between the first node and the end node. If the end node has not been reached, then in step 410 the QoS information and traffic specification information is sent to the next node in the path and the process of resource reservation begins anew and the next node in the path. In this fashion, all nodes in the path between the first node and the end node advantageously reserve the necessary resources for real-time transmission of data at the desired QoS level. Once the end node is reached, as determined in step 405, then in step 415 the last node sends a reservation success message back to the first node. Upon receipt of the reservation success message, the first node informs the upper layer or application and the reliable transmission may begin, as shown in step 420.

FIG. 15 is a flow diagram illustrating an example process for resource reservation according to an embodiment of the present invention. The illustrated process may be carried out by a wireless node in a UWB network, for example the nodes previously described in FIGS. 1, 2, 3, and 6. The illustrated process can be used, for example, in the context of step 385 previously described with respect to FIG. 14. Initially, in step 430 the node determines the number of timeslots that are required for the transmission of the data. Next, in step 435 the node identifies the link over which the data will be sent. This can be accomplished by determining the best route to the end node, which can be calculated, for example, based on minimum hop count. Advantageously, each link in the path is already know to be a high quality real-time transmission channel pursuant to the topology formation process previously described with respect to FIG. 11. Once the target link is identified, in step 440 the node then allocates the appropriate number of timeslots to that link to carry the traffic at the desired QoS level.

Figure 16:
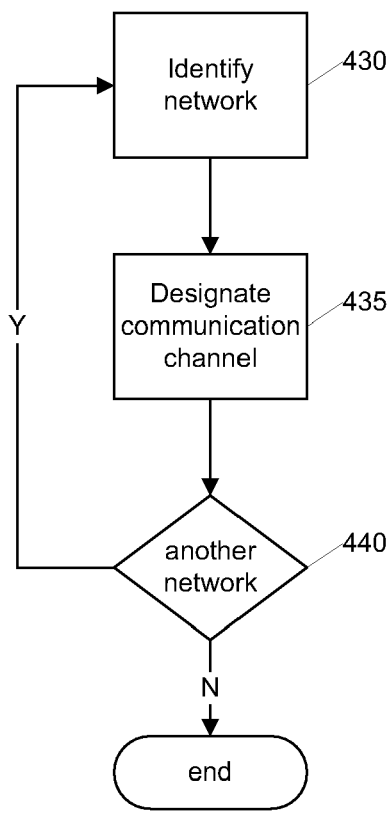
FIG. 16 is a flow diagram illustrating an example process for multi-network communication according to an embodiment of the present invention.

FIG. 16 is a flow diagram illustrating an example process for multi-network communication according to an embodiment of the present invention. The illustrated process may be carried out by a wireless node in a UWB network, for example the nodes previously described in FIGS. 1, 2, 3, and 6. Initially, in step 430 the node identifies a wireless communication network. This may be accomplished, for example, by receiving and examining a beacon signal sent by a node that is a member of the network or sent by an access point for the network. Next, in step 435 the node designates a communication channel for communicating with the identified network. In one embodiment, the node may sequence a variety of communication channels and select the channel with the strongest signal or the highest expected throughput. Alternatively, if the characteristics of the identified network indicate that the network is not used for high bandwidth communications, e.g., a control data network, then the node may designate a channel with an appropriate level of bandwidth and quality of service, etc.

If there are other available wireless communication networks, as determined in step 440, the node loops back to identify the new network and designate a communication channel for that network. In this fashion, a node may identify and dynamically establish separate communication channels for discrete network. Advantageously, this allows the node to participate in a high bandwidth UWB communication network that facilitates a high bandwidth application such as high definition television programming, internet protocol television programming, multiplayer gaming, multimedia conference calling, and any other high bandwidth application. The high bandwidth application can therefore dominate the traffic on a particular network while data traffic for other applications is designated for other discrete networks.

Thus, a node can be simultaneously connected to a digital home network and provide multiplayer gaming to a user while also monitoring a separate network for incoming VoIP telephone calls. Many other significant advantages can be obtained by dedicating particular applications to discrete networks such as implementation of node based security such that only predetermined nodes are allowed to communicate over a designated network.

Alternatively, a node such as node 126 may be simultaneously communicatively coupled with network 106 and network 108, for example, when node 126 is in range of both networks. In such an embodiment, node 126 may establish a first communication channel that is configured for communications on network 108 and a second communication channel that is configured for communications on network 106. Accordingly, the node 126 can simultaneously communicate on both discrete networks 106 and 108 by dedicating a separate communication channel to each network. In one embodiment, the node 126 may be communicatively coupled with a plurality of discrete networks via a plurality of separate communication channels.

Figure 17:
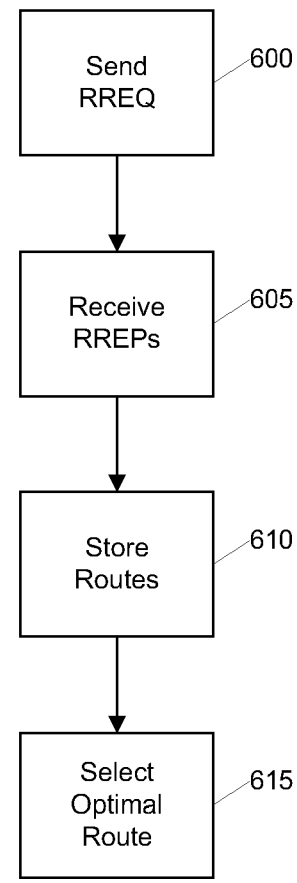
FIG. 17 is a flow diagram illustrating an example process for virtual mesh networking with layer-2 routing and dynamic resource allocation according to an embodiment of the present invention.

FIG. 17 is a flow diagram illustrating an example process for virtual mesh networking with layer-2 routing and dynamic resource allocation according to an embodiment of the present invention. The illustrated process may be carried out by a wireless node in a UWB network, for example the nodes previously described in FIGS. 1, 2, 3, and 6. Initially, in step 600 the source node sends out a routing request ("RREQ"). Prior to sending out the RREQ, the node may have also completed certain tasks for mesh communications, e.g., calculating the number of timeslots needed for a communication based on the available link capacity and QoS requirements and selecting a suitable number of timeslots that do not present a conflict for allocation. These processes have been previously described with respect to FIGS. 10-15, for example.

Once a RREQ has been sent out it may be received by more than one recipient node. These recipient nodes that receive the RREQ process the request by taking steps to identify a next node in the path to the destination node and conducting dynamic resource allocation, e.g., timeslot reservation, etc. If the node is unsuccessful in establishing the route through to a next node, then the node does not forward the RREQ. For example, if the number of available timeslots required for the designated level of QoS is insufficient then the node is unsuccessful. Also, if the number of consumed timeslots is larger than the number in previous RREQs, that may trigger an unsuccessful attempt to establish a route.

The intermediary nodes in the path to the destination node continue to forward the RREQ until the destination node receives one or more RREQs from one or more nodes via one or more paths. Then the destination node sends a route reply ("RREP") back to the source node via each of the one or more routes. Alternatively a single RREP may be sent that identifies the one or more routes by which the destination node received the RREQ.

Next, in step 605 the source node receives the one or more RREPs and then stores the various alternative routes as shown in step 610. Going forward, as the source node carries out communications with the destination node, in step 615 the source node selects the optimal route to the destination node based on the route characteristics. For example, the route may be selected based on its use of minimal resources, based on its ability to carry a maximum payload, based on its fewest number of hops, or based on the highest average signal quality for each link in the route, just to name a few.

In one embodiment, if multiple transmission requests are received at the same time or if the route setup process for a first transmission request is underway when a second transmission request is received, or any other circumstance where the source node could send out more than one RREQ before receiving back all of the corresponding RREPs, then the multiple RREQs could result in conflicts with respect to resource allocation. Accordingly, the destination node is configured to check the availability of timeslots when the RREP is to be sent back to ensure that there are available timeslots. If none are available, then the RREP is not sent.

In an alternative embodiment, the source node can be configured such that it only sends out a single RREQ at a time. Such an embodiment may employ a tokenized solution or periodic processing and has the advantage of being faster when the arrival rate of transmission requests is high due to minimal conflicts of resource allocation.

With respect to transmission rate adaptive resource allocation, the resource requirements need to be mapped into timeslots, which requires careful maintenance of resources and their allocations, for example in resource allocation tables, and localized checking of resource availability.

In one embodiment, these challenges are addressed by performing rate adaptive resource allocation based on a smoothed physical transmission rate and the maintenance of separate resource allocation tables. For example, there may be a first resource allocation table for reserved timeslots and channels, a second resource allocation table for desired timeslots and channels (where desired timeslots are requested timeslots that have passed resource checking), and additional resource allocation tables for each routing path for a desired timeslot.

Additionally, when allocating timeslots and channels, a node determines which resource allocation tables for desired timeslots need to be checked and allocates new timeslots and channels based on resource allocation tables for reserved timeslots and desired timeslots. In one embodiment, if enough timeslots can accommodate the transmission request, the new requested timeslots are put into the resource allocation table for the desired timeslots.

Also, when intermediate nodes are forwarding or discarding RREQs based on resource availability, these nodes are advantageously configured to account for link capacity and also to convert desired timeslots into reserved timeslots. Because multiple RREQ/RREP paths may exist, the conversion is not done in the RREP phase.

With respect to discarding an RREQ, if the required timeslots (e.g., as determined by the desired QoS) cannot be satisfied, the RREQ for that link is discarded. In an alternative embodiment, a RREQ can be forwarded or discarded based on a new routing metric. For example, a routing metric may include the consideration of the total number of requested timeslots over multiple hops in the same interference range, e.g., the timeslot-hop product ("THP"). Additionally, a RREQ requiring more resources than in a previous RREQ can be discarded and in one embodiment it must be discarded. Also when a new RREQ requesting more resources arrives at a node earlier, that RREQ may still be forwarded, and for multiple RREQs on the same link, each RREQ is associated with a value of a routing metric.

In one embodiment, a RREP can be forwarded or discarded based on a new routing metric. For example, an RREP with a larger routing metric value that arrives later is discarded (and in one embodiment must be discarded), and an RREP with a larger routing metric value that arrives earlier may still be forwarded.

Additionally, in one embodiment the routing path that needs the minimum resources is the one that is selected. In such an embodiment, a specific routing resource metric may be employed to account for end to end resources on a particular routing path so that paths can be accurately compared to distinguish between them and identify the optimal routing path, e.g., the one requiring the minimum resources. In one embodiment, resources from end-to-end in a routing path may be reserved by sending a resource reservation ("RRES").

In one embodiment, for QoS mapping and traffic specification, resource allocation needs to know what the QoS parameters are and these parameters may not be available from the application. Nodes are therefore configured to derive such information from the packets themselves. For example, certain fields in the packets such as DSCP, port number, and others can be examined and based on the application type (e.g., as derived from the port number) such as voice data, audio data, video data, multimedia data, high definition television ("HDTV") data, multiplayer video game data, single or simultaneous multimedia data streams, communication control data, and the like. The QoS parameters may also be derived based on traffic estimations for packets without specific traffic fields.

In one embodiment there may be a specified mapping between various application types and their respective QoS parameters. Certain applications may also have a traffic specification profile that can be consulted to identify the QoS parameters based on application type (even though the specific application itself does not include those parameters). In one embodiment, such a profile can be identified by a user or the parameters can be specified by the user and then stored in a profile for future applications of the same type.

As a practical matter, most applications that desire to send data do not wait for permission to sending data (e.g., admission) and instead immediately send packets upon startup. Additionally, some application use the routing information protocol ("RIP") or the real time control protocol ("RTCP") for setting up connections, but these protocols do not operate at the MAC layer.

Accordingly, nodes are configured to employ a MAC layer admission control mechanism that initiates the setting up of routing when packet transmission from a higher layer (e.g., an application) is detected. The nodes queue up packets from the higher layer until a routing path is established and resource allocation has been completed via dynamic resource allocation. The node is further configured to then send the packets and work with application layer signaling.

In one embodiment, when selecting the optimal route, a node is configured to consider that many applications, while they do not demand specific levels of QoS support, these applications are expected to use as much network resource as possible (e.g., best effort). Thus, a node is configured to implement separate layer-2 routing and dynamic resource allocation procedures for best effort traffic. In one embodiment, the layer-2 routing procedure only forwards the RREQ on a link with the largest amount of remaining resources. For example, the remaining resources may be calculated based on link capacity, consumed capacity reserved for QoS traffic, and the remaining sum of traffic load for current best effort traffic.

Advantageously, no resource allocation needs to be performed in dynamic resource allocation (because no capacity is being reserved to meet a desired QoS level) and therefore load balancing routes can be selected and established to help optimize communications over the entire network. An alternative option may include establishing a particular level of QoS and a traffic specification profile (or application profile) for the given level of best effort traffic and then implementing the QoS layer-2 routing techniques and dynamic resource allocation to establish routing paths.

In one embodiment, certain legacy clients also need to be able to participate in a VMesh network. These legacy clients therefore need to be able to reserve or allocate timeslots and channels to access certain network infrastructure such as mesh routers, etc. These legacy clients also need to have their traffic forwarded to other nodes via layer-2 routing. Advantageously, such legacy clients can be accommodated by reserving certain timeslots for such clients. In one embodiment, the number of legacy client timeslots is calibrated according to a client profile such as the number of clients, traffic type, etc. Additionally, the MAC address header can also be expanded to store a client's source and destination MAC addresses and/or IP addresses.

For example, if a destination MAC is stored, a scalable multi-hop inverse address resolution protocol ("InARP") solution can be employed to find a client's destination MAC address based on its destination IP address. Thus, when packets arrive at the destination edge mesh router, they are directly forwarded to the appropriate client with the specified destination MAC address. Alternatively, if the destination IP address is stored, then when packets arrive at the destination edge mesh router, the address resolution protocol ("ARP") can be employed to identify the destination MAC address and then packets are forwarded to the destination clients in that fashion.

Figure 18:
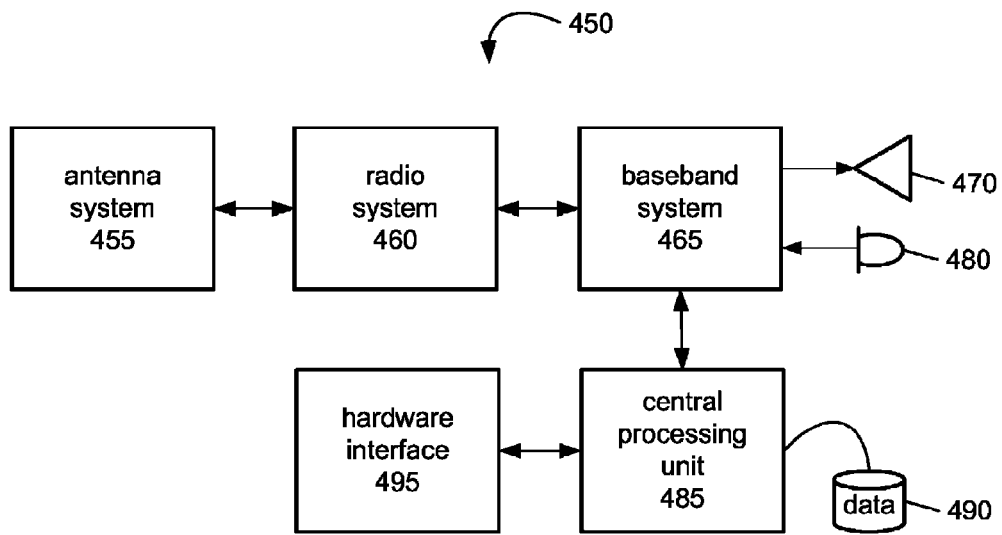
FIG. 18 is a block diagram illustrating an example wireless communication device that may be used in connection with various embodiments described herein.

FIG. 18 is a block diagram illustrating an example wireless communication device 450 that may be used in connection with various embodiments described herein. Other wireless communication devices and/or architectures may also be used, as will be clear to those skilled in the art.

In the illustrated embodiment, wireless communication device 450 comprises an antenna system 455, a radio system 460, a baseband system 465, a speaker 464, a microphone 470, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexers (not shown) that perform a switching function to provide the antenna system 455 with transmit and receive signal paths. In the receive path, received RF signals can be coupled from a multiplexer to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) that were previously described with respect to FIGS. 6-9.

In this description, the term "computer readable medium" is used to refer to any media used to provide executable instructions (e.g., software and computer programs) to the wireless communication device 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the wireless communication device 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the device 450 include data storage devices, computing devices, headphones, microphones, and the like.

Figure 19:
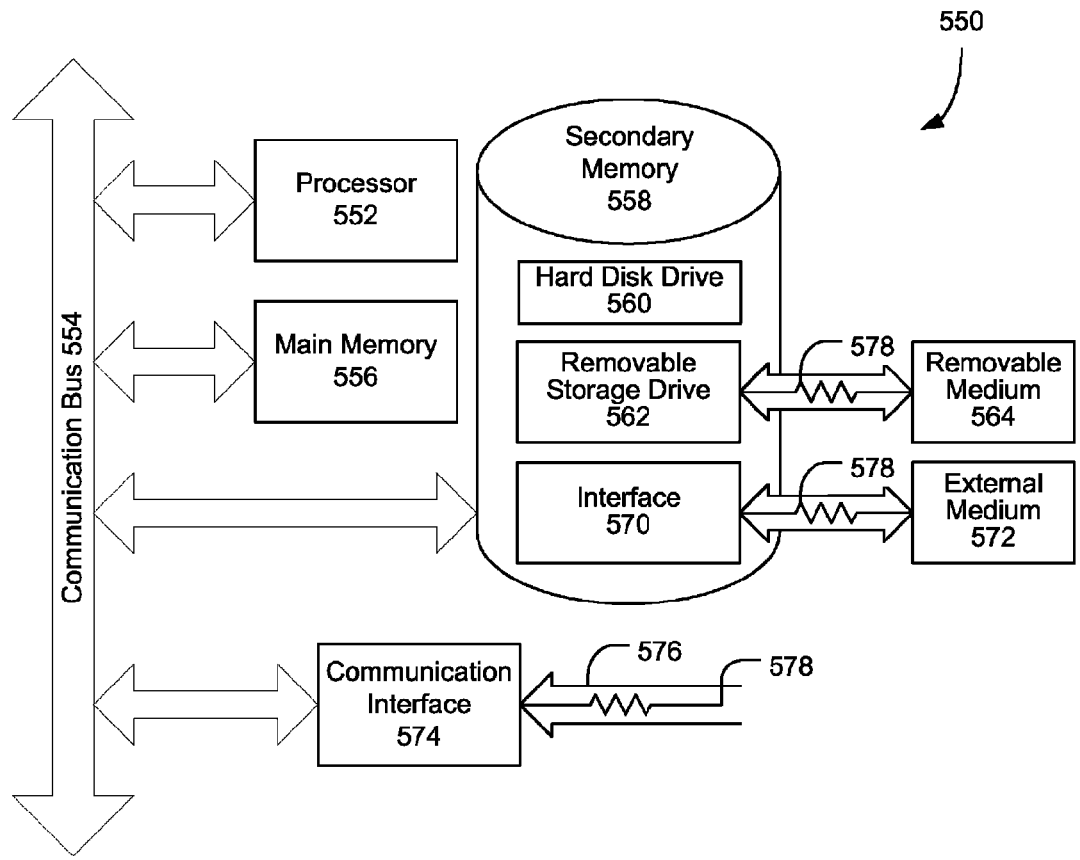
FIG. 19 is a block diagram illustrating an example computer system that may be used in connection with various embodiments described herein.

FIG. 19 is a block diagram illustrating an example computer system 550 that may be used in connection with various embodiments described herein. Other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

The invention claimed is:

1. A communication apparatus comprising:
a first node configured to communicate directly with a plurality of second nodes and indirectly with at least a third node accessible via one or more of the second nodes, the first node including a media access control (MAC) module configured to facilitate communications with the second and third nodes over communication links with the second nodes;
wherein the MAC module is configured to determine available routes between the first and third node by: (i) identifying which communication links with the second nodes have a sufficient number of timeslots available to meet a minimum quality of service (QoS) level, (ii) transmitting a routing request to the respective second nodes over the identified communication links indicating a requested number of timeslots that need to be reserved at each communication link to meet the minimum QoS level, the routing request indicating the first node as the ultimate source and the third node as the ultimate destination, and refraining from transmitting the routing request over communication links with respective second nodes that have not been identified as having a sufficient number of timeslots available to meet the minimum QoS level, and (iii) responsive to receiving one or more route replies from the third node indicating one or more available routes between the first and third nodes meeting or exceeding the minimum QoS level, to send communications to the third node via the indicated one or more available routes.

2. The apparatus of claim 1, wherein the first, second, and third nodes form a multi-hop ultra wide band (UWB) communication network.

3. The apparatus of claim 1, wherein each second node in the plurality of second nodes further comprises a MAC module configured to facilitate wireless communications by receiving the routing request, determining a next destination node in a path to reach the third node, and determining whether a sufficient number of timeslots are available on a communication link to the next destination node.

4. The apparatus of claim 1, wherein the first node further comprises a topology module configured to determine a network topology of at least the plurality of second nodes and nodes that are an additional communication link hop from the second nodes, network topology information being exchanged via beaconing signals, and the network topology information including at least timeslots already allocated to the plurality of second nodes and the nodes that are an additional communication link hop from the second nodes.

5. The apparatus of claim 1, wherein the one or more route replies includes route characteristic information indicating characteristics of each communication link between the first node and the third node, the MAC module configured to store the route characteristic information and use the information in a subsequent route selection process.

6. The apparatus of claim 5, wherein the route characteristic information includes at least one selected from the group consisting of a maximum number of timeslots at each communication link and an available number of timeslots at each communication link.

7. The apparatus of claim 1, wherein the MAC module is further configured to perform layer-2 routing of all received and transmitted packets.

8. The apparatus of claim 1, wherein the MAC module receives two or more route replies indicating an availability of at least two different routes from the first node to the third node, and wherein the MAC module is configured to substantially simultaneously send communications to the third node via at least two of the indicated two or more routes.

9. The apparatus of claim 1, wherein the MAC module is further configured, responsive to a failure to receive any route replies from the third node, to provide an indication to a higher layer protocol that there are insufficient resources between the first node and the third node to facilitate communications at the requested number of timeslots.

10. The apparatus of claim 1, wherein the MAC module is configured to determine available routes between the first and third node responsive to detecting a new connection request from a higher layer in the communication stack.

11. The apparatus of claim 10, wherein the higher layer is the application layer.

12. The apparatus of claim 10, wherein the MAC module is further configured to, responsive to failing to receive any route replies indicating one or more available routes between the first and third nodes meeting or exceeding the minimum QoS level, informing the higher layer that the new connection request failed.

13. A wireless communication apparatus comprising:
a third node configured to communicate directly with a plurality of second nodes and indirectly with at least a first node accessible via one or more of the second nodes, the third node including a media access control (MAC) module configured to facilitate communications with the second and third nodes over communication links with the second nodes;
wherein the MAC module is configured to receive one or more routing requests from the first node via one or more of the plurality of second nodes and, responsive to the receipt of the one or more routing requests, to send one or more routing replies responsive to the one or more received routing requests to the first node, and further responsive to sending the one or more routing replies, to receive communications from the first node;
wherein each of the one or more routing requests indicates (i) a requested number of timeslots that need to be reserved at each communication link between the first node and the third node, (ii) the first node as the ultimate source and the third node as the ultimate destination, and (iii) that at least one network path exists between the first node and third node where each communication link in the network path has the requested number of timeslots available; and
wherein the one or more routing replies transmitted to the first node by the MAC module identify the corresponding at least one network path and includes route characteristic information indicating characteristics of each communication link between the first node and the third node.

14. The apparatus of claim 13, wherein the MAC module is further configured to simultaneously communicate over a plurality of different ultra wide band (UWB) communication channels.

15. The apparatus of claim 13, wherein the MAC module is further configured to perform layer-2 routing of all received and transmitted packets.

16. The apparatus of claim 13, wherein the MAC module receives two or more routing requests from the first node, sends a routing reply to each of the two or more routing requests, and simultaneously receives communications from the first node via two or more different routes.

17. The apparatus of claim 13,
wherein the route characteristic information includes at least one selected from the group consisting of a maximum number of timeslots at each communication link and an available number of timeslots at each communication link.

18. The apparatus of claim 13, wherein the third node further comprises a topology module configured to determine a network topology of at least the plurality of second nodes and nodes that are an additional communication link hop from the second nodes, network topology information being exchanged via beaconing signals, and the network topology information including at least timeslots already allocated to the plurality of second nodes and the nodes that are an additional communication link hop from the second nodes.

19. A communication apparatus comprising:
a second node configured to communicate directly or indirectly with a first node and directly or indirectly with a third node, the second node including a media access control (MAC) module configured to facilitate communications with the first and third nodes via respective communication links between the first and third nodes;
wherein the MAC module is configured to: (i) receive a routing request from the first node indicating a requested number of timeslots that need to be reserved at each communication link to meet a minimum quality of service (QoS) level, the routing request indicating the first node as the ultimate source and the third node as the ultimate destination, (ii) identify next destination nodes available on a path to reach the third node, (iii) identify which communication links with identified next destination nodes have a sufficient number of timeslots available to meet the minimum QoS level, and (iv) forward the routing request to respective next destination nodes over the identified communication links and refrain from forwarding the routing request over communication links with respective next destination nodes that have not been identified as having a sufficient number of timeslots to meet the minimum QoS level.

20. The apparatus of claim 19, wherein the MAC module is further configured to, responsive to a determination that a sufficient number of timeslots are available on the communication links to the respective one or more next destination nodes, reserve the number of timeslots.

21. The apparatus of claim 20, wherein the MAC module is further configured to transmit route characteristic information to respective next destination nodes over the identified communication links indicating characteristics of the respective communication link.

22. The apparatus of claim 21, wherein the route characteristic information includes at least one selected from the group consisting of a maximum number of timeslots of the communication link with the next destination node and an available number of timeslots of the communication link with the next destination node.

23. The apparatus of claim 19, wherein the MAC module is further configured to discard the routing request responsive to a determination that a sufficient number of timeslots are not available on the communication links to the one or more identified next destination nodes.

24. The apparatus of claim 19, wherein the MAC module is further configured to perform layer-2 routing of all received and transmitted packets.

25. The apparatus of claim 19, wherein the MAC module is further configured to transmit a message to the first node responsive to a determination that a sufficient number of timeslots are not available on the communication link to the next destination node, the message informing the first node of the lack of a sufficient number of timeslots at the second node to meet the request.

26. A method of connecting a first node with a third node via communication links with one or more intermediate second nodes in a multi-hop network comprising:
a first node determining available routes between the first and third node by: (i) identifying which communication links with the second nodes have a sufficient number of timeslots available to meet a minimum quality of service (QoS) level, (ii) causing a media access control (MAC) module to transmit a routing request to the respective second nodes over the identified communication links indicating a requested number of timeslots that need to be reserved at each communication link to meet the minimum QoS level, the routing request indicating the first node as the ultimate source and the third node as the ultimate destination, and causing the MAC to refrain from transmitting the routing request over communication links with respective second nodes that have not been identified as having a sufficient number of timeslots available to meet the minimum QoS level, and (iii) receiving one or more route replies from the third node at the MAC module indicating one or more available routes between the first and third nodes meeting or exceeding the minimum QoS level; and
the first node sending communications to the third node using one or more of the indicated available routes.

27. The method of claim 26, wherein the MAC module receives two or more route replies indicating the availability of at least two different routes from the first node to the third node, the method further comprising the first node sending communications to the third node using two or more of the indicated available routes.

28. The method of claim 26, wherein the one or more route replies includes route characteristic information indicating characteristics of each communication link between the first node and the third node, the method further comprising storing the route characteristic information and using the information in a subsequent route selection process.

29. The method of claim 28, wherein the route characteristic information includes at least one selected from the group consisting of a maximum number of timeslots at each communication link and an available number of timeslots at each communication link.

30. The method of claim 26, wherein the first node determines available routes between the first and third node responsive to detecting a new connection request from a layer in the communication stack higher than the MAC layer.

31. The method of claim 30, wherein the layer higher than the MAC layer is the application layer.

32. The method of claim 30, further comprising the first node again determining available routes between the first and the third node in response to detecting a second new connection request, and responsive to failing to receive any route replies indicating one or more available routes between the first and third nodes meeting or exceeding a minimum QoS level associated with the second new request, informing the layer higher than the MAC layer that the second new connection request failed.

33. A method of connecting a first node with a third node via one or more intermediate second nodes in a multi-hop network comprising:
   a second node receiving a routing request from the first node indicating a requested number of timeslots that need to be reserved at each communication link to meet a minimum quality of service (QoS) level, the routing request indicating the first node as the ultimate source and the third node as the ultimate destination;
   the second node identifying next destination nodes available on a path to reach the third node;
   the second node determining which communication links with identified next destination nodes have a sufficient number of timeslots available to meet the minimum QoS level, and
   the second node forwarding the routing request to respective next destination nodes over the identified communication links and refraining from forwarding the routing request over communication links with respective next destination nodes that have not been identified as having a sufficient number of timeslots to meet the minimum QoS level.

34. The method of claim 33, further comprising, responsive to a determination that a sufficient number of timeslots are available on the communication links to the respective one or more next destination nodes, reserving the number of timeslots.

35. The method of claim 33, further comprising the step of discarding the routing request responsive to a determination that a sufficient number of timeslots are not available on the communication links to the one or more identified next destination nodes.

36. The method of claim 33, further comprising transmitting a message to the first node responsive to a determination that a sufficient number of timeslots are not available on the communication link to the next destination node, the message informing the first node of the lack of a sufficient number of timeslots at the second node to meet the request.

37. The method of claim 33, further comprising the second node transmitting route characteristic information to respective next destination nodes over the identified communication links indicating characteristics of the respective communication link.

38. The method of claim 37, wherein the route characteristic information includes at least one selected from the group consisting of a maximum number of timeslots of the communication link with the next destination node and an available number of timeslots of the communication link with the next destination node.

39. A method of connecting a first node with a third node via one or more intermediate second nodes in a multi-hop network comprising:
   a third node receiving one or more routing requests at a media access control (MAC) module from the first node via one or more of the plurality of second nodes;
   responsive to the receipt of the one or more routing requests, the third node sending one or more routing replies to the first node; and
   the third node receiving communications from the first node using one or more of the routes indicated in the one or more routing requests,
   wherein each of the one or more routing requests indicates (i) a requested number of timeslots that need to be reserved at each communication link between the first node and the third node, (ii) the first node as the ultimate source and the third node as the ultimate destination, and (iii) that at least one network path exists between the first node and third node where each communication link in the network path has the requested number of timeslots available; and
   wherein the one or more routing replies transmitted to the first node by the MAC module identify the corresponding at least one network path and includes route characteristic information indicating characteristics of each communication link between the first node and the third node.

40. The method of claim 39, wherein the MAC module receives two or more route requests via at least two different routes from the first node, the method further comprising the step of sending a reply to each of the two or more route requests and simultaneously receiving communications from the first node using two or more of the routes indicated in the two or more routing requests.

41. The method of claim 39,
   wherein the route characteristic information includes at least one selected from the group consisting of a maximum number of timeslots at each communication link and an available number of timeslots at each communication link.

42. A computer readable medium having stored thereon, computer executable instructions that, in response to execution by a first device in a network, cause the first device to perform operations comprising:
   the first device determining available routes between the first device and a third device by (i) identifying which communication links with a plurality of intermediate second devices have a sufficient number of timeslots available to meet a minimum quality of service (QoS) level, (ii) causing a media access control module (MAC) to transmit a routing request to the respective second devices over the identified communication links indicating a requested number of timeslots that need to be reserved at each communication link to meet the minimum QoS level, the routing request indicating the first device as the ultimate source and the third device as the ultimate destination, and refraining from transmitting the routing request over communication links with respective second devices that have not been identified as having a sufficient number of timeslots available to meet the minimum QoS level, and (iii) receiving one or more route replies from the third device at the MAC module indicating one or more available routes between the first and third devices meeting or exceeding the minimum QoS level; and
   the first device sending communications to the third device using one or more of the indicated available routes.

43. The computer readable medium of claim 42, wherein the one or more route replies includes route characteristic information indicating characteristics of each communication link between the first device and the third device,
   the operations further comprising storing the route characteristic information and using the information in a subsequent route selection process.

44. The computer readable medium of claim 43, wherein the route characteristic information includes at least one selected from the group consisting of a maximum number of timeslots at each communication link and an available number of timeslots at each communication link.

45. A computer readable medium having stored thereon, computer executable instructions that, in response to execution by a second device in a network, cause the second device to perform operations comprising:

the second device receiving a routing request from a first device indicating a requested number of timeslots that need to be reserved at each communication link to meet a minimum quality of service (QoS) level, the routing request indicating the first device as the ultimate source and the third device as the ultimate destination;

the second device identifying next destination devices available on a path to reach the third device;

the second device determining which communication links with identified next destination devices have a sufficient number of timeslots available to meet the minimum QoS level, and the second device forwarding the routing request to respective next destination devices over the identified communication links and refraining from forwarding the routing request over communication links with respective next destination devices that have not been identified as having a sufficient number of timeslots to meet the minimum QoS level.

46. The computer readable medium of claim 45, wherein the operations further comprise:

the second device, responsive to a determination that a sufficient number of timeslots are available on the communication links to the respective one or more next destination devices, reserving the number of timeslots.

47. The computer readable medium of claim 45, wherein the operations further comprise:

the second device discarding the routing request responsive to a determination that a sufficient number of timeslots are not available on the communication links to the one or more identified next destination devices.

48. The computer readable medium of claim 45, wherein the operations further comprise:

transmitting a message to the first device responsive to a determination that a sufficient number of timeslots are not available on the communication links to the one or more identified next destination devices, the message informing the first device of the lack of a sufficient number of timeslots at the second device to meet the request.

49. The computer readable medium of claim 45, wherein the operations further comprise:

the second device transmitting route characteristic information to respective next destination devices over the identified communication links indicating characteristics of the respective communication link.

50. The computer readable medium of claim 49, wherein the route characteristic information includes at least one selected from the group consisting of a maximum number of timeslots and an available number of timeslots.

51. A computer readable medium having stored thereon, computer executable instructions that, in response to execution by a third device in a network, cause the third device to perform operations comprising:

receiving one or more routing requests at a media access control (MAC) module from a first device via one or more of a plurality of intermediate second devices;

responsive to the receipt of the one or more routing requests, sending one or more routing replies to the first device; and receiving communications from the first device using one or more of the routes indicated in the one or more routing requests, wherein each of the one or more routing requests indicates (i) a requested number of timeslots that need to be reserved at each communication link between the first device and the third device, (ii) the first node as the ultimate source and the third node as the ultimate destination, and (iii) that at least one network path exists between the first device and third device where each communication link in the network path has the requested number of timeslots available; and wherein the one or more routing replies transmitted to the first node by the MAC module identify the corresponding at least one network path and includes route characteristic information indicating characteristics of each communication link between the first device and the third device.

52. The computer readable medium of claim 51, wherein the route characteristic information includes at least one selected from the group consisting of a maximum number of timeslots at each communication link and an available number of timeslots at each communication link.

* * * * *

UNITED STATES PATENT AND TRADEMARK OFFICE
CERTIFICATE OF CORRECTION

| | | |
|---|---|---|
| PATENT NO. | : 7,941,149 B2 | Page 1 of 1 |
| APPLICATION NO. | : 11/615582 | |
| DATED | : May 10, 2011 | |
| INVENTOR(S) | : Wang et al. | |

It is certified that error appears in the above-identified patent and that said Letters Patent is hereby corrected as shown below:

Title Page 3, item (56), under "Other Publications", in Column 1, Line 6, delete "Wirelss" and insert -- Wireless --.

Title Page 3, item (56), under "Other Publications", in Column 2, Line 3, delete "8(3):" and insert -- 8(2): --.

Title Page 3, item (56), under "Other Publications", in Column 2, Line 5, delete "Handing" and insert -- Handling --.

Title Page 3, item (56), under "Other Publications", in Column 2, Line 8, delete "Wirelss" and insert -- Wireless --.

Signed and Sealed this
Fourth Day of October, 2011

David J. Kappos
*Director of the United States Patent and Trademark Office*